July 24, 1956 B. A. WITTKUHNS ET AL 2,755,471
BLANK STAPLING APPARATUS
Filed Jan. 5, 1954 12 Sheets-Sheet 1
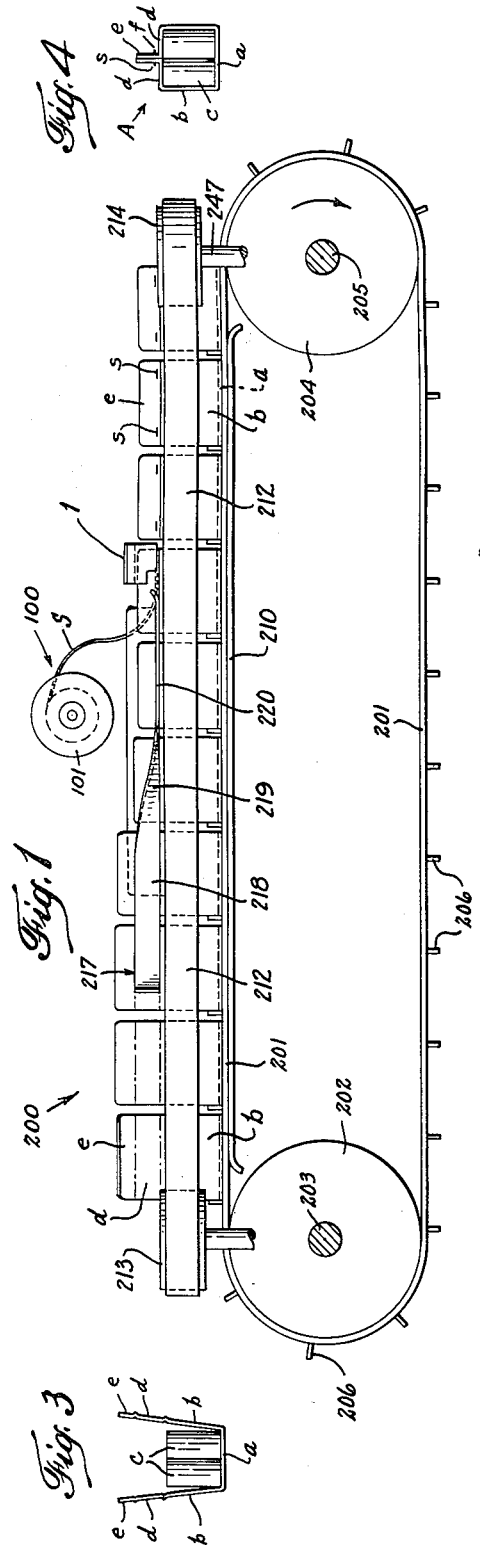
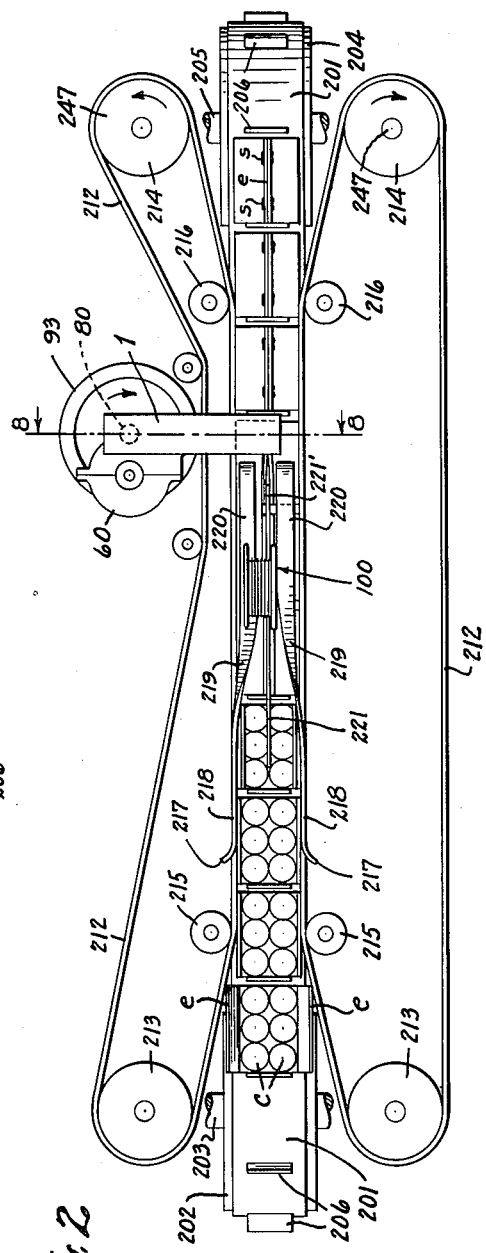
INVENTORS
BRUNO A. WITTKUHNS
GILBERT F. HILL
BY
Reuben J. Carlson
ATTORNEY

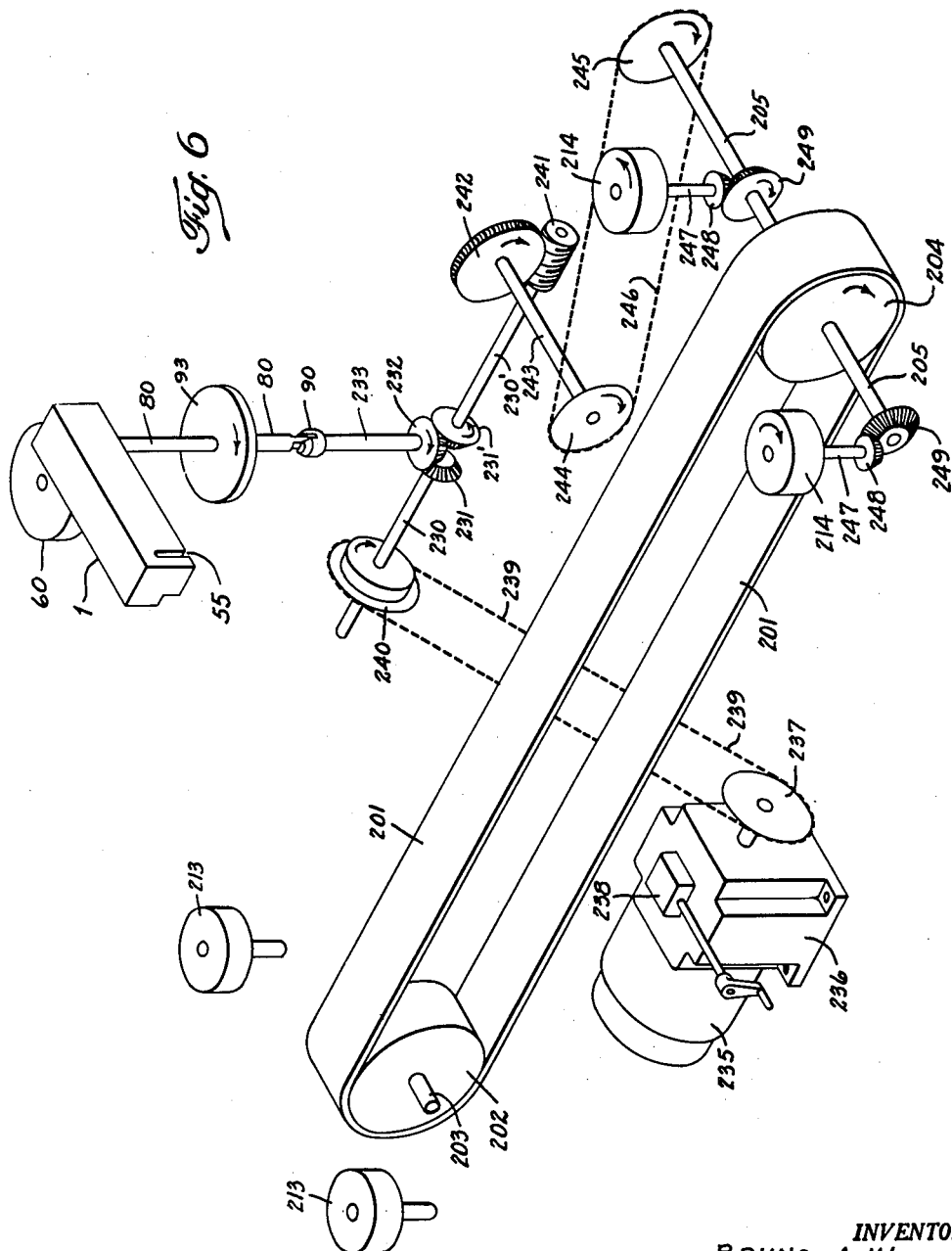

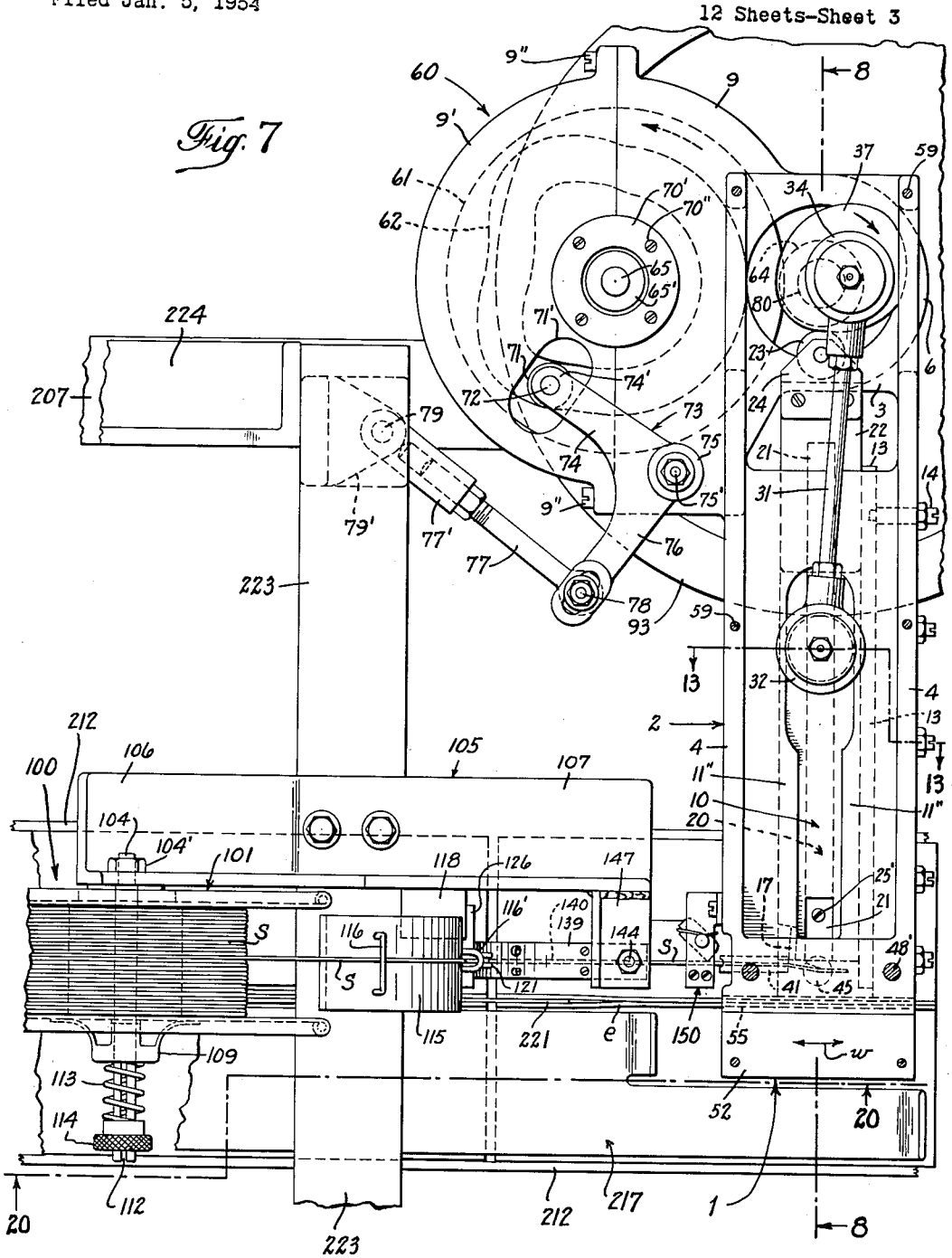

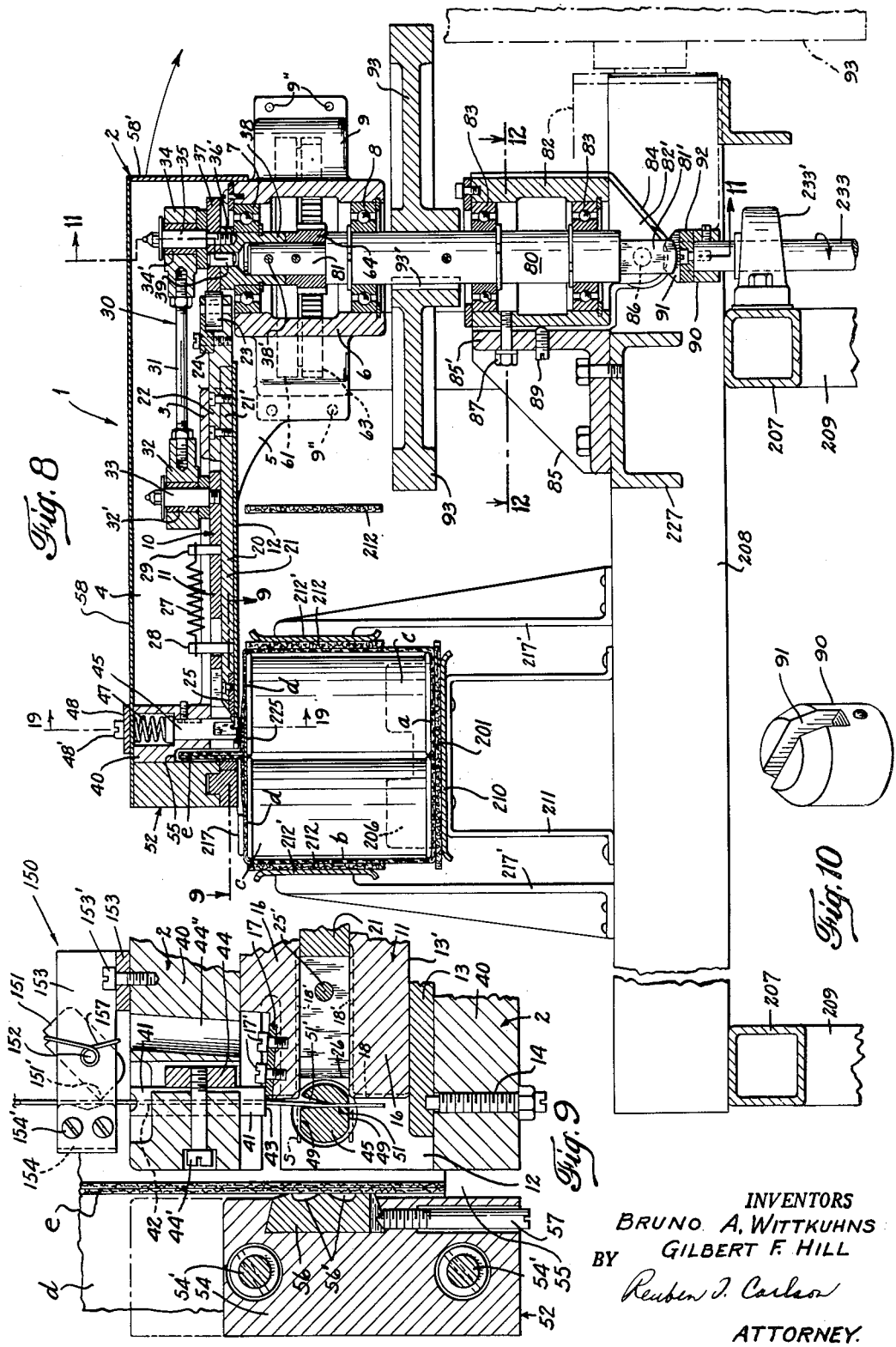

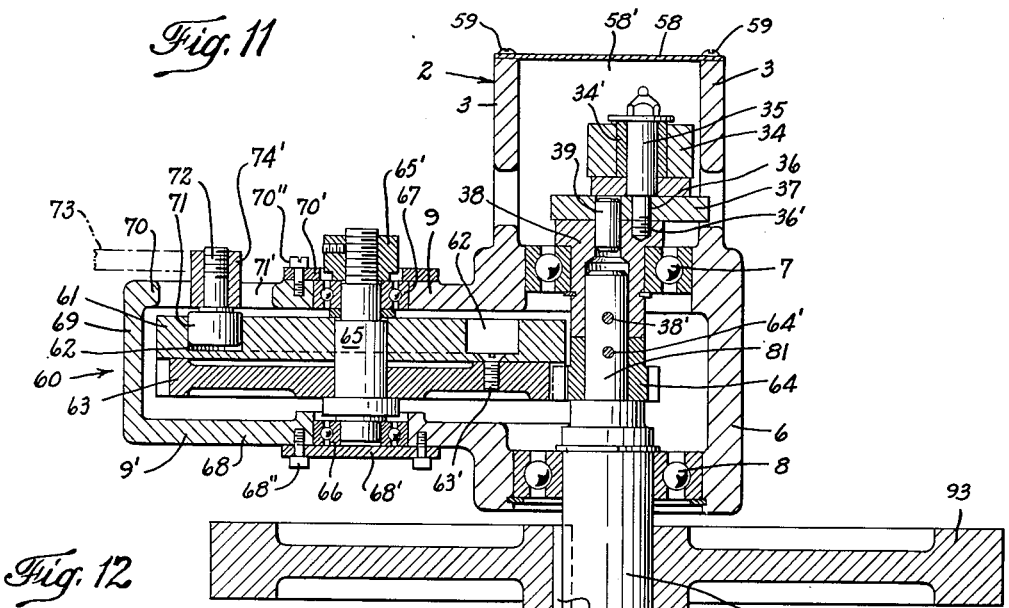
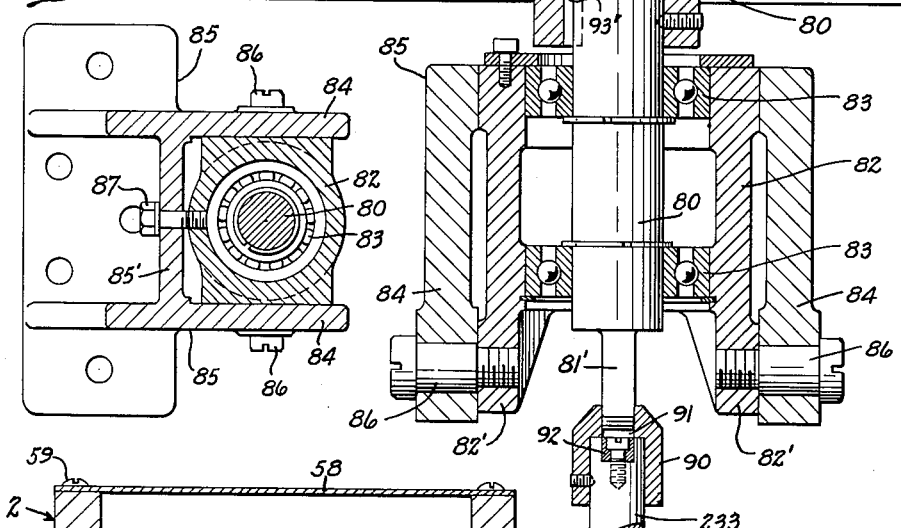

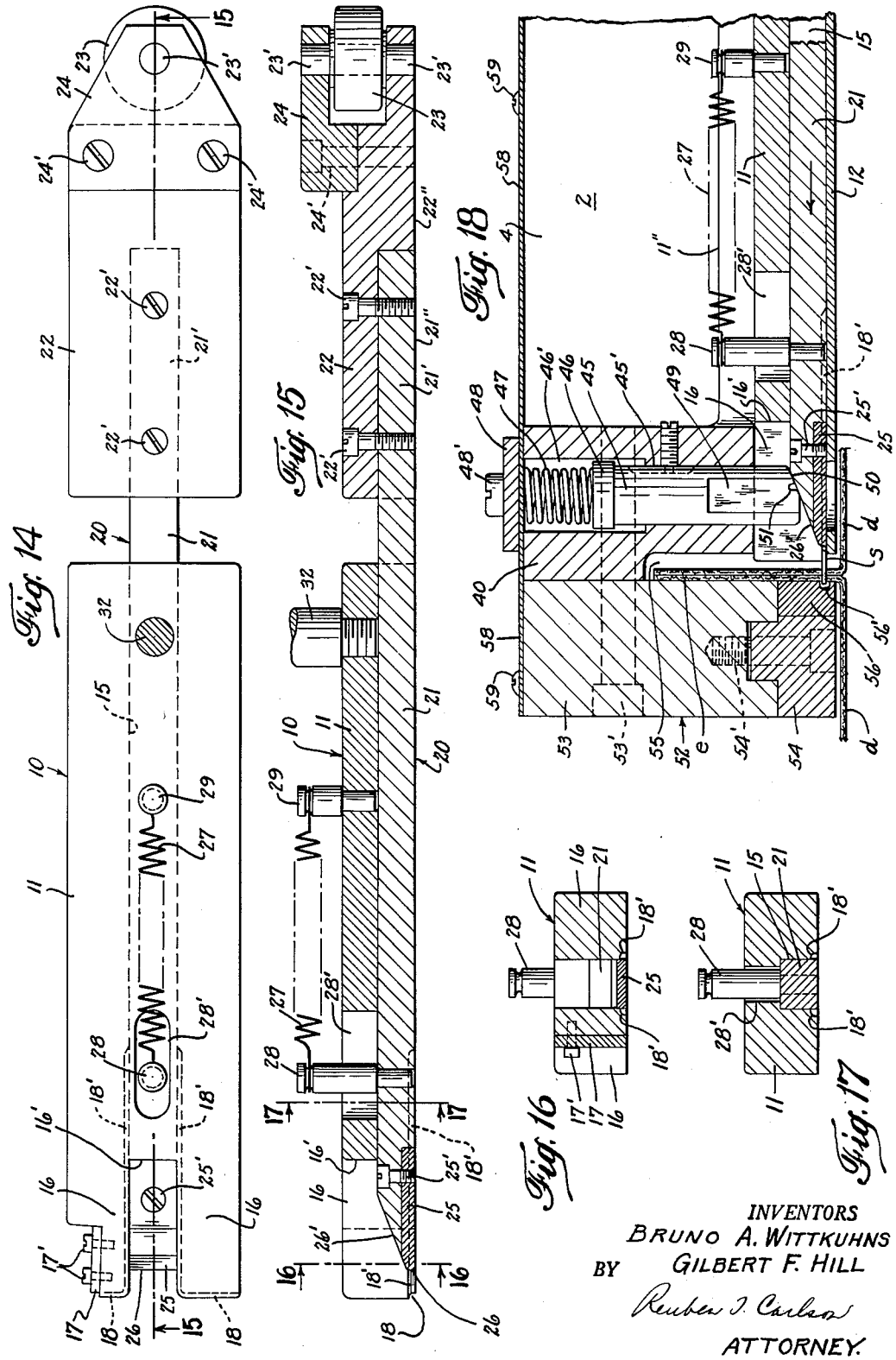

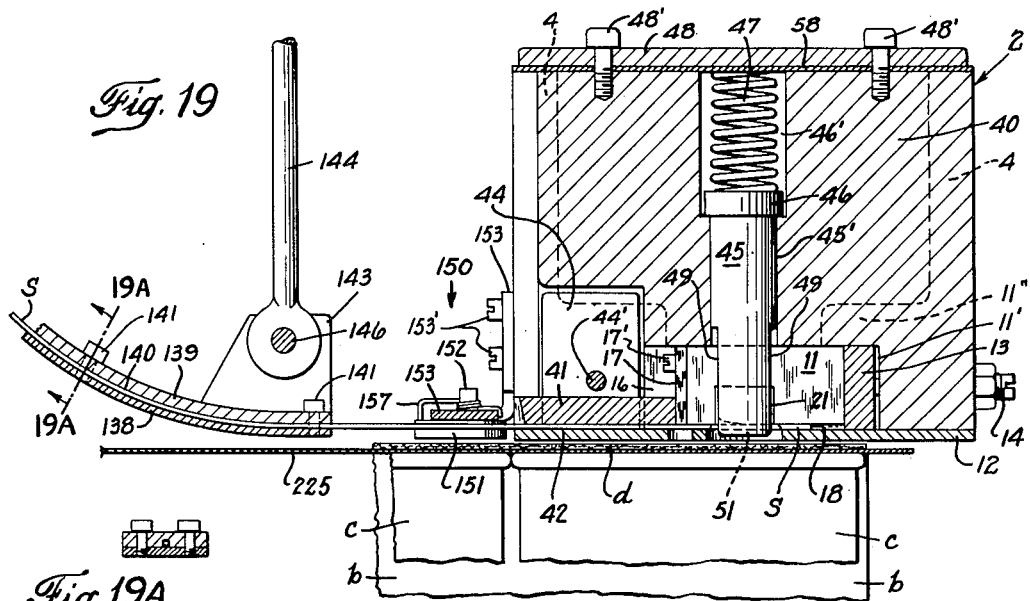
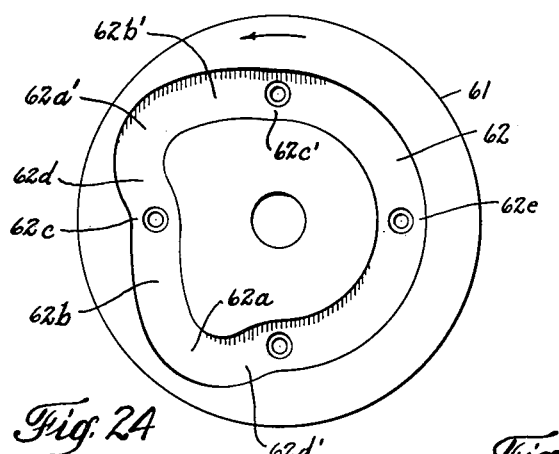
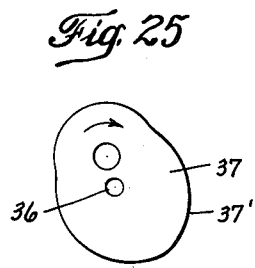
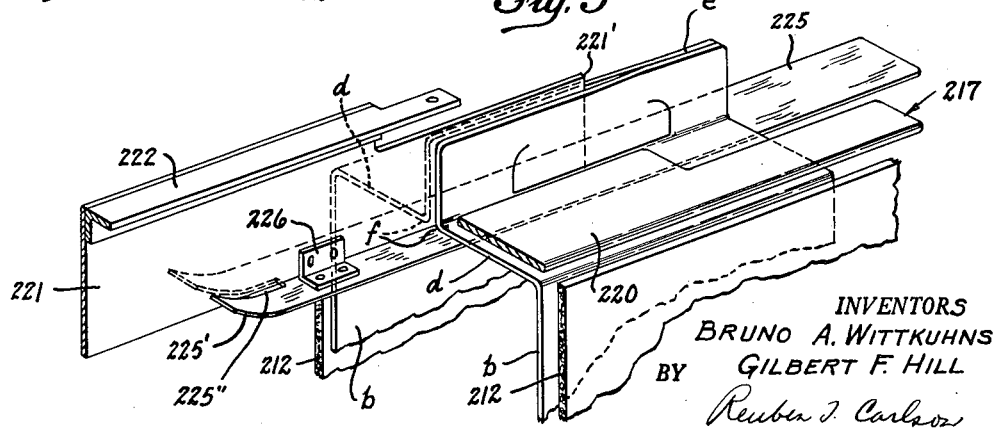
INVENTORS
BRUNO A. WITTKUHNS
GILBERT F. HILL
BY Reuben J. Carlson
ATTORNEY.

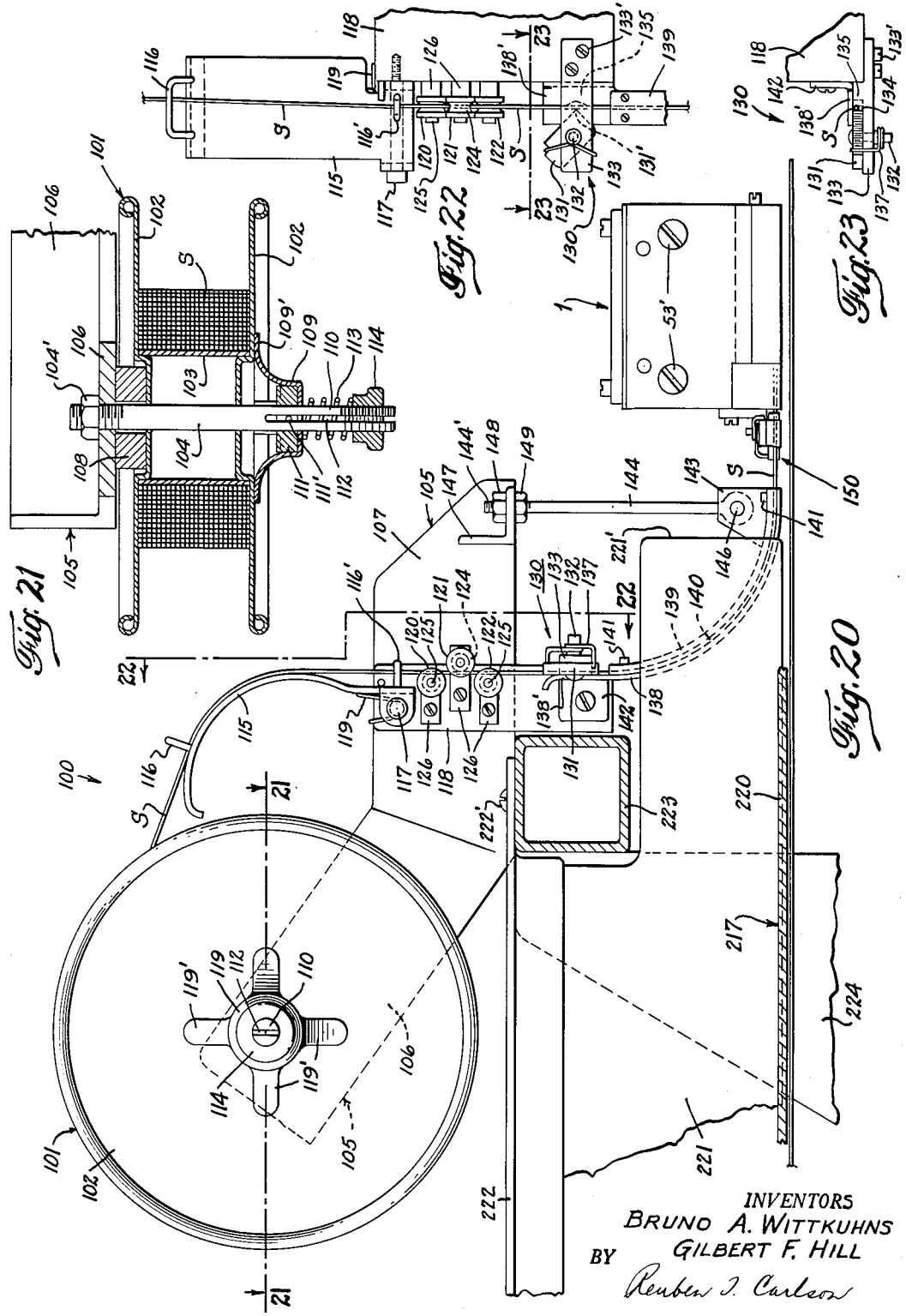

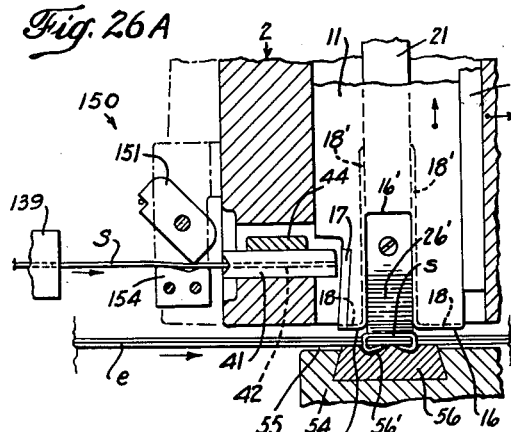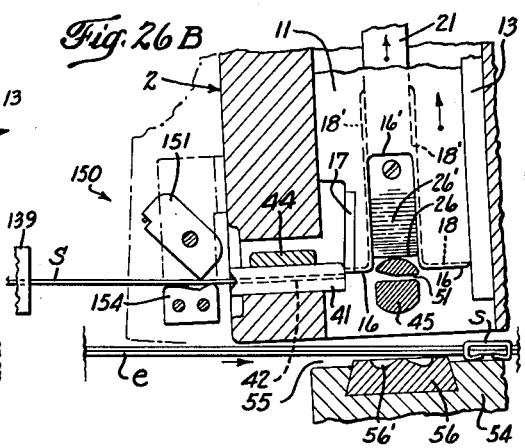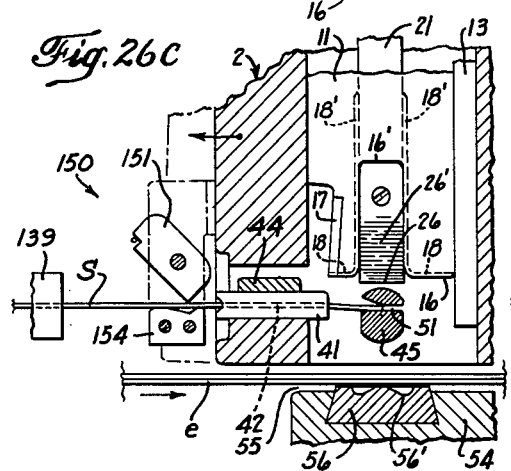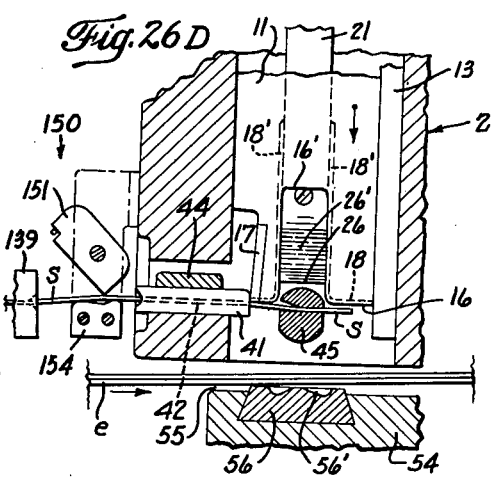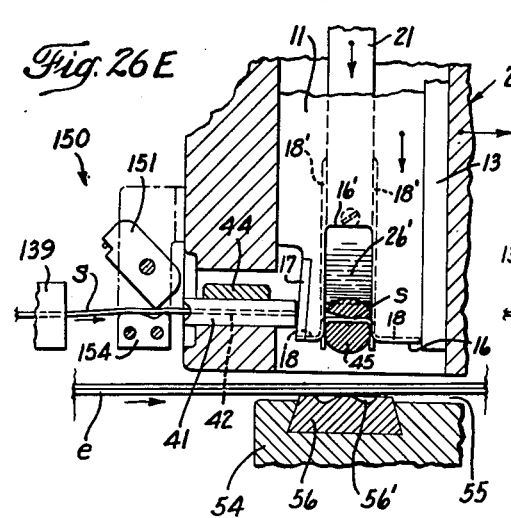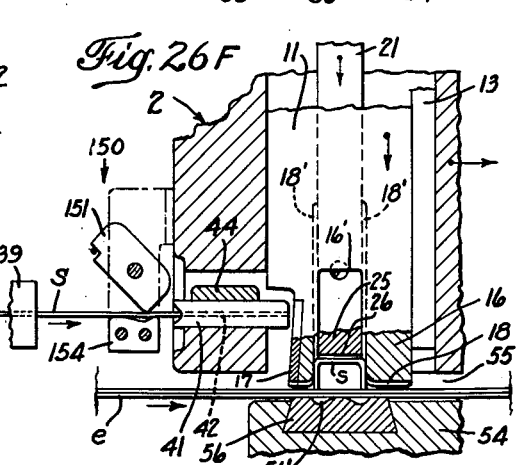
INVENTORS
BRUNO A. WITTKUHNS
GILBERT F. HILL
BY
ATTORNEY.

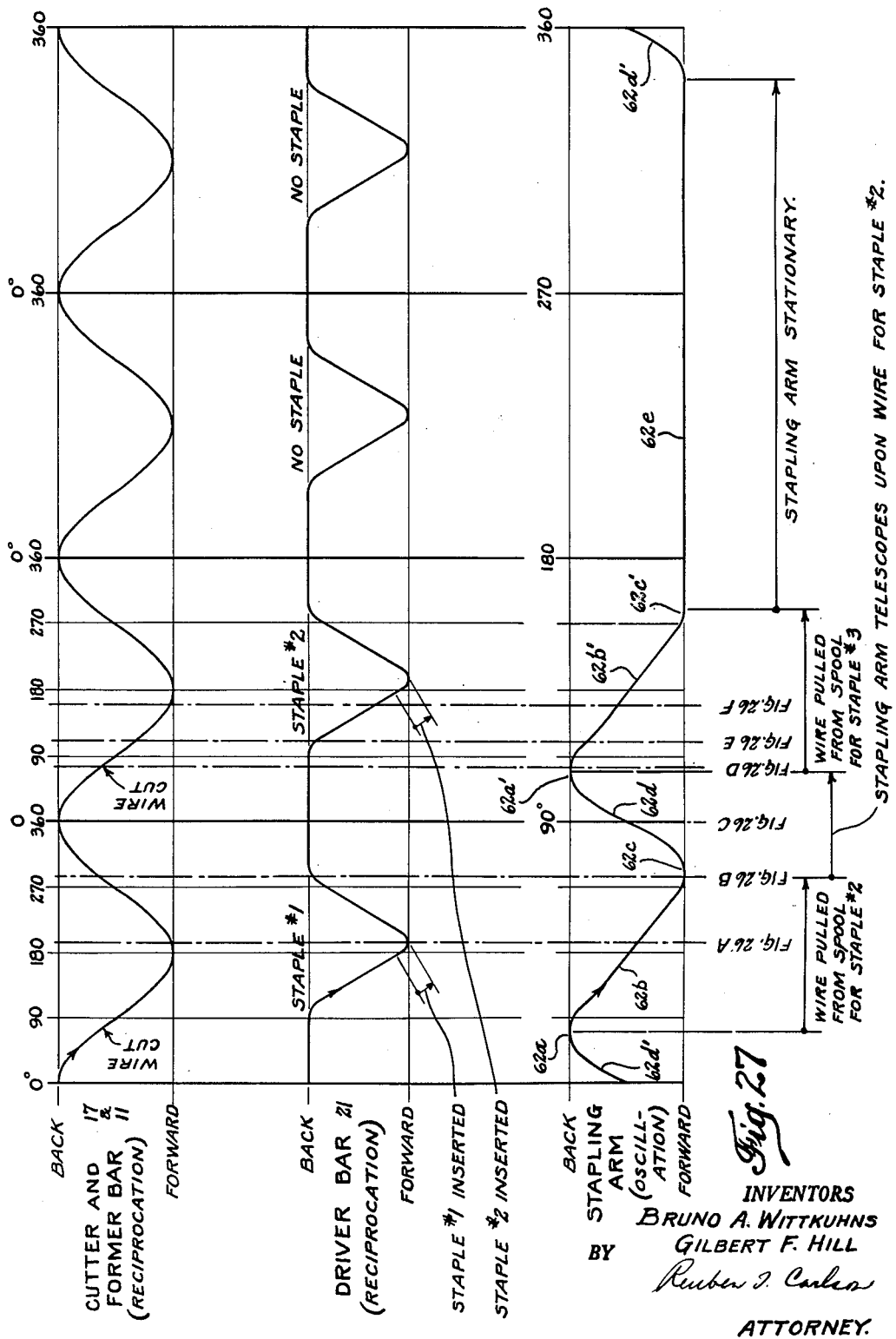

July 24, 1956  B. A. WITTKUHNS ET AL  2,755,471
BLANK STAPLING APPARATUS

Filed Jan. 5, 1954  12 Sheets-Sheet 11

INVENTORS
BRUNO A. WITTKUHNS
BY   GILBERT F. HILL

Reuben ? Carlson

ATTORNEY

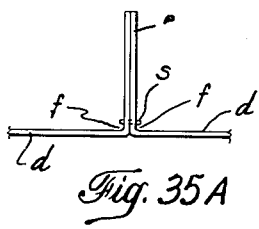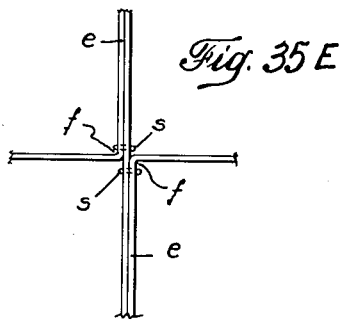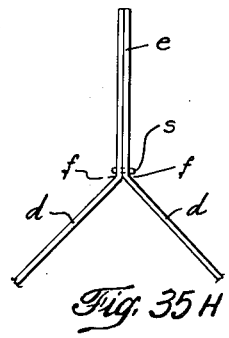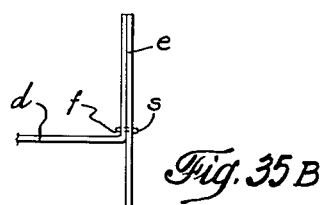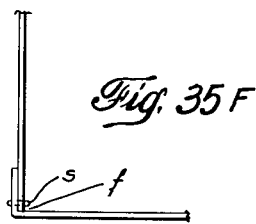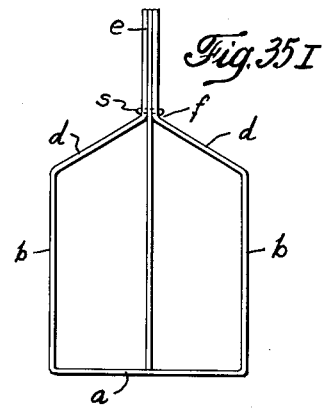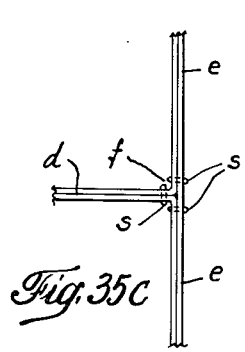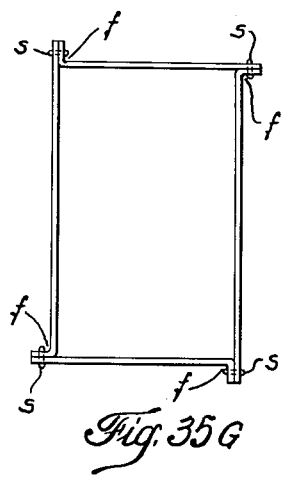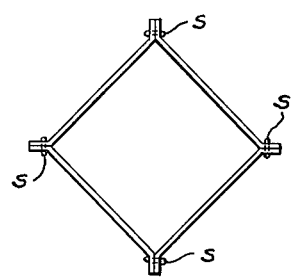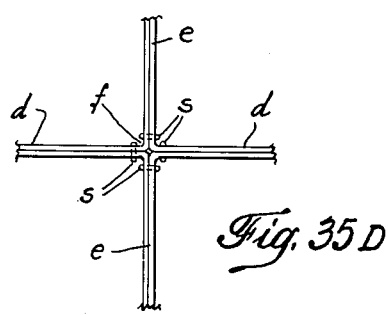

United States Patent Office 2,755,471
Patented July 24, 1956

2,755,471

BLANK STAPLING APPARATUS

Bruno A. Wittkuhns and Gilbert F. Hill, Skaneateles, N. Y., assignors to The Gardner Board & Carton Co., Middletown, Ohio, a corporation of Ohio Application January 5, 1954, Serial No. 402,279

48 Claims. (Cl. 1—2)

This invention relates to blank stapling apparatus and more particularly to automatic staple forming and driving mechanism operating in synchronism with a continuously traveling conveyor whereby staples may be successively applied in predetermined spaced relationship to workpieces during the continued and uninterrupted advance thereof on the conveyor.

The folding and erection of containers, cartons and wrappers, and the merchandise loading and closing of cartons, containers and wrappers can be accomplished with the greatest efficiency and production speed when the operations are performed in association with a continuously moving article supporting conveyor. When the cartons, containers or wrapper parts are to be secured together as by glue or adhesive, the gluing operation can usually be performed during continuous travel of the workpieces on a conveyor traveling at constant speed. However, where parts of the workpieces are to be stapled together, it has been the general practice to provide an intermittently moving conveyor for the workpieces so that the workpieces can be successively advanced stage by stage to a stationary stapling station where the stapling operation is performed during the interval that the workpiece remains in residence at the stapling station.

Various suggestions have been advanced and various mechanisms proposed for the application of staples to workpieces during continuous and uninterrupted travel of the workpieces along a conveyor line, but no fully satisfactory solution has been found. Apparatus has been proposed which comprises a series of radially extending staple forming and driving heads mounted on a rotatable arbor containing complicated operating mechanism which rotates the arbor to place the successive stapling heads in a tangential position with respect to the article conveyor line, and then driving the staple into the article at the point of tangency as the workpieces to be stapled advance and the stapling head supporting arbor continues to rotate. Such apparatus presents problems in connection with the feeding of the wire sections into the successive stapling heads during rotation of the arbor. The manipulating mechanism for the stapling head is also complicated, costly and unreliable in operation, and successive staples can only be applied to the same or successive workpieces when the staples are spaced substantial distances apart.

Apparatus has also been proposed wherein the stapling head is mounted on a rolling table or platform adjacent the article conveyor line, which mechanism for reciprocating the platform in such manner that the stapling head supporting platform advances in one direction at the speed of the traveling conveyor during the staple applying operation, and then moves rearwardly and equal distance to place the stapling head in position to apply the next succeeding staple during repeat forward movement of the platform. Such apparatus requires that the operating motor and all the driving and wire feeding mechanisms be mounted on the reciprocable platform which greatly adds to the mass weight to be reciprocated. As a result, a substantial amount of power is consumed in reciprocating the stapling head platform, its heavy massweight can only be shifted at relatively low speed, the platform and the operating mechanism mounted thereon are subjected to substantial stress and vibration, and soon wear out after a short period of operation. Additionally, staples applied by such apparatus must be spaced a substantial distance apart and the article supporting conveyor line must be driven at relatively low speed with resultant low production output.

In stapling together two angular shaped parts presenting a pair of overlapped leg sections connected to other sections which flare laterally at substantially a right angle to the overlapped leg sections, it is often desirable to drive the staple as close as possible to the bend or crotch line which joins the overlapped leg sections to the laterally flared sections, so that spreading separation of the leg sections is prevented when outward separating stress is applied to the laterally flared sections. Application of the staples sufficiently close to the crotch line of the angularly shaped parts of the workpiece to thus prevent spreading separation of the overlapped leg sections is particularly difficult when stapling mechanisms as presently designed are employed, since the staple clinching anvil, staple forming bar and staple driving bar of the stapling arm are so designed that when the nose of the stapling arm is brought into abutment against the laterally flared sections of the workpiece, the paired leg sections will be stapled together at a point spaced a considerable distance above the crotch or bend line between the paired leg sections and the laterally flared sections.

This invention is directed to the provision of stapling apparatus designed to operate in synchronized association with a continuously traveling workpiece supporting conveyor and whereby successive staples can be rapidly applied in any predetermined spaced relationship to workpieces while undergoing continued and uninterrupted advance along the conveyor. The improved stapling apparatus of this invention may be operated to apply one hundred fifty or more staples per minute to continuous traveling workpieces, and by making relatively simple adjustments, successive staples may be applied in accordance with any desired and predetermined spacing. Additionally, this improved stapling apparatus operates successfully when the successive workpieces are arranged on the conveyor in closely adjacent position.

This improved stapling apparatus is also particularly designed to apply staples closely adjacent to the crotch line of a workpiece. For example, by the use of this stapling apparatus paired leg sections of the workpiece may be stapled together within an eighth to a sixteenth of an inch from the crotch line or fold which connects the paired leg sections to flared sections of the workpiece extending either at an obtuse angle or a right angle to the leg sections. Application of staples sufficiently close to the crotch line of angularly shaped workpiece parts is oftent highly important in many operations since the staples as thus applied prevents spreading separation of the overlapped leg sections as stapled together.

The stapling apparatus of this invention embodies a pivotally mounted stapling arm designed to be rapidly oscillated through a limited arc. Rapid oscillation of the stapling arm is made possible by its relatively light but strong construction. The stapling arm is composed of relatively few and light weight elements such as a staple former and driver, with necessary guides therefor built into the stapling arm, and an associated staple clinching block formed as a part of the stapling arm and oscillatable therewith. While strong in construction the stapling arm is light in weight and thus possesses little inertia resistance to rapid oscillation. The driving mechanism for the staple former and driver is mounted on the main shaft of the stapling mechanism which rotates but does not oscillate, and the stapling arm is thus relieved of the weight inertia of the driving devices.

The stapling arm is oscillated through the agency of a cam wheel having a cam track of predetermined form. The cam wheel which oscillates the stapling arm is driven through gears operably connected to the main drive shaft of the stapling mechanism. A bell crank lever has a cam roller secured to one arm thereof which projects into the cam groove of the cam wheel. The bell crank lever is also pivotally secured to the stapling arm and to stationary framework of the conveyor, and thus operates to oscillate the stapling arm during continuous rotation of the cam wheel in timed synchronism to the movements of the stapler former and driver.

This invention also embodies wire feeding devices which operate in timed synchronism to the oscillating movement of the stapling arm to feed a staple forming segment of a wire into forming position within the stapling head during the return oscillation stage of the stapling arm. At the initiation of the forward oscillating stage of the stapling arm, the staple forming segment of wire is cut to staple length, and during the forward oscillating stage the staple is formed, driven into the workpiece, and clinch-locked thereto. By variously modifying the shape of the cam track in the stapling arm oscillating cam wheel, the stapling arm may be oscillated through any desired arc and the applied staples may be given any desired spacing.

The main drive shaft of the stapling mechanism may be directly connected to the main drive shaft of the conveyor so that the conveyor and stapling mechanism may be driven in timed synchronism from a common power source. This improved stapling apparatus may be associated with almost any form or kind of a continuously traveling workpiece conveyor and may be mounted to drive staples in either a horizontal, vertical or inclined direction. The stapling mechanism may also be mounted to permit the same to be swung away from the conveyor line to facilitate adjustment and repair thereof.

The stapling apparatus of this invention is designed to apply staples to various kinds and forms of sheet materials such as paperboard, fiberboard, composition board, as well as plastic, metal and other sheet materials and compositions. The stapling apparatus of this invention is relatively simple in construction, is composed of relatively few moving parts, can be constructed at relatively low cost, is highly serviceable and lasting in use, is positive and reliable in operation, and by a simple interchange of a cam wheel part can be adjusted to vary the spacing between successively applied staples to any spacing distance desired.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is a diagrammatic side elevational view of one form of continuously driven conveyor which may be driven in operating synchronism with the stapling apparatus of this invention to apply spaced staples to the handle part of a can enclosing wrapper blank during continuous travel of the can packed wrappers on the conveyor;

Fig. 2 is a diagrammatic top plan view of the stapling apparatus in association with the continuously driven conveyor of the type illustrated in Fig. 1;

Fig. 3 is an end view of a wrapper blank containing cans as the same would appear prior to enfolding of the top panel sections of the blank and stapling of the paired handle sections thereof;

Fig. 4 is an end view of the wrapper blank as the same would appear when the paired handle sections thereof have been stapled together to provide a complete carrier package;

Fig. 5 is a fragmentary prospective view of the blank guiding devices which may be associated with the conveyor to support and adjust the top panel sections and paired handle sections of the can wrapper blank for stapling at the stapling station.

Fig. 6 is a diagrammatic illustration of the driving mechanism which may be employed for operating the stapling head and article conveyor in synchronism from a single power source;

Fig. 7 is a top plan view showing the stapling machine and associated wire feed mechanism in greater detail;

Fig. 8 is a vertical cross section of the stapling machine, a portion of the conveyor and a can package in position for stapling and as the same would appear when viewed along line 8—8 of Figs. 2 and 7;

Fig. 9 is an enlarged fragmentary cross section taken horizontally through the stapling arm as the same would appear when viewed along line 9—9 of Fig. 8;

Fig. 10 is a perspective view of the coupling member which may be used to detachably connect the main shaft of the stapling machine to the end of a driven shaft associated with the continuous conveyor;

Fig. 11 is another cross sectional view of the stapling machine as the same would appear when viewed along line 11—11 of Fig. 8;

Fig. 12 is a horizontal cross section of the mounting for the main shaft of the stapling machine which permits swinging movement of the stapling head and associated drive mechanism to and from working position to facilitate adjustment and repair thereof, this view being taken along line 12—12 of Fig. 8;

Fig. 13 is a transverse cross section of the stapling arm as the same would appear when viewed along line 13—13 of Fig. 7;

Fig. 14 is a detailed plan view of the staple former and associated staple driver which form parts of the stapling arm of the machine;

Fig. 15 is a longitudinal cross sectional view of the staple former and associated staple driver as the same would appear when viewed along line 15—15 of Fig. 14;

Fig. 16 is a transverse section taken across the operating end of the staple former and driver as the same would appear when viewed along line 16—16 of Fig. 15;

Fig. 17 is another transverse section of the staple former and driver as the same would appear when viewed along line 17—17 of Fig. 15;

Fig. 18 is an enlarged fragmentary cross section taken vertically through the operating end of the stapling arm as the same would appear when viewed along a portion of the line 8—8 of Fig. 7, the parts being shown in a different operating position;

Fig. 19 is an enlarged cross section taken transversely of the stapling arm as the same would appear when viewed along line 19—19 of Fig. 8, this view also showing a section of the wire guide and wire gripper attached to the stapling arm;

Fig. 19a is a cross sectional detail of a part of the wire guide as the same would appear when viewed along line 19a—19a of Fig. 19;

Fig. 20 is a side elevation partly in section of the wire reel and associated wire guiding devices for supplying staple-forming sections of wire to the stapling arm of the machine as viewed along the line 20—20 of Fig. 7.

Fig. 21 is a cross section of the wire reel and associated support and tensioning device as the same would appear when viewed along line 21—21 of Fig. 20;

Fig. 22 is a vertical elevation of a portion of the wire guiding devices as the same would appear when viewed along line 22—22 of Fig. 20;

Fig. 23 is a cross sectional detail of the wire gripper which prevents backlash of the stapling wire withdrawn from the wire reel as the same would appear when viewed along line 23—23 of Fig. 22;

Fig. 24 is a plan view of one form of cam member which may be associated with the stapling machine for oscillating the stapling arm in timed synchronism with the continuously traveling conveyor;

Fig. 25 is a plan view of the cam associated with the crank arm of the stapling machine to manipulate the staple former and staple driver;

Figure 30:
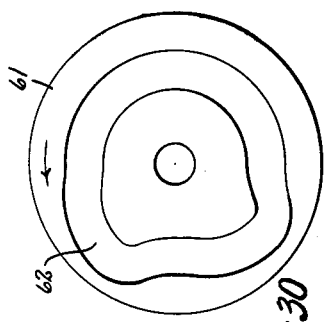
Figure 32:
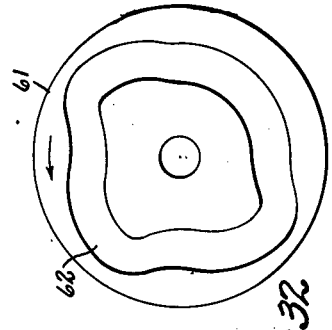
Figure 34:
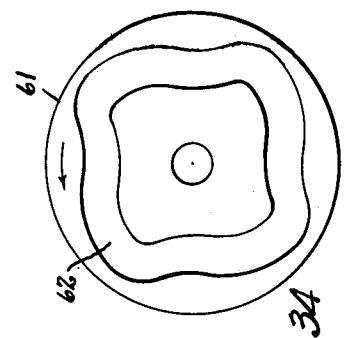
Figure 29:
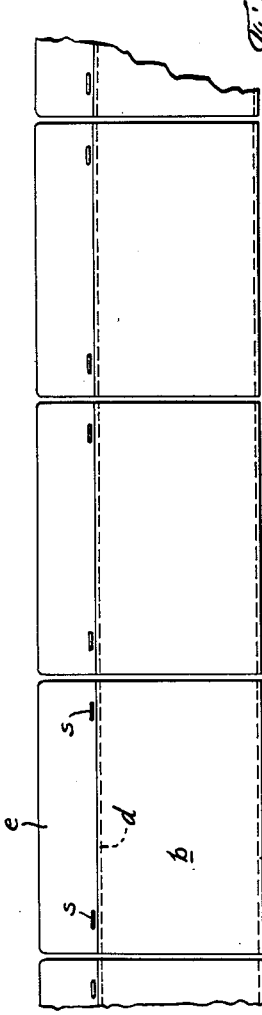
Figure 31:
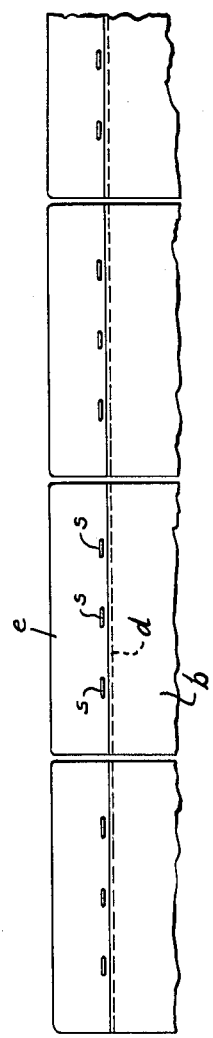
Figure 33:
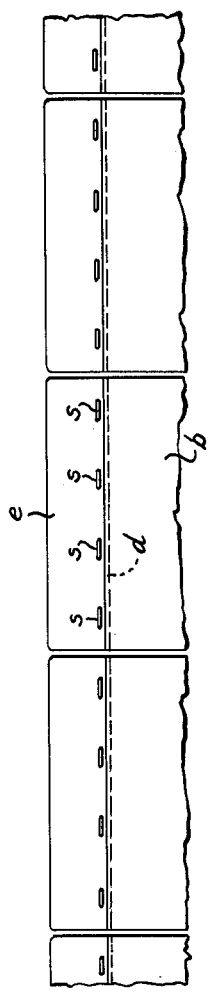
Figure 28:
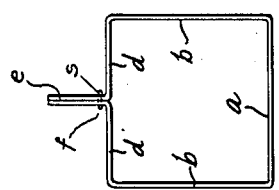

Figs. 26A, 26B, 26C, 26D, 26E and 26F are a series of fragmentary cross sectional views of the operating elements of the stapling arm and associated staple clinching block to illustrate the successive positional movements of the cooperating elements during the staple clinching stage, the wire feeding stage, the wire cutting stage, the staple forming stage, and the staple driving stage as successively executed during manipulation of the stapling arm elements through a complete cycle of operation;

Fig. 27 is a diagram which indicates the relative angular movements of the crank driven staple former and cutter, the cam driven staple driver, and the cam oscillated stapler arm during four complete revolutions of the main shaft of the stapling machine;

Fig. 28 is an end view of a fully stapled can wrapper blank showing the manner in which the paired handle sections thereof may be stapled together in close proximity to the crotch line of the paired handle sections by the use of the stapling apparatus of this invention;

Fig. 29 is a side elevational view of a series of completed can packages whose paired handle sections are secured together by two staples which are spaced as indicated;

Fig. 30 is a plan view of the stapling arm oscillating cam whose cam track is shaped to insure application of two staples to each pair of handle sections of a series of continuously traveling wrapper blanks in accordance with the staple spacing indicated in Fig. 29;

Fig. 31 is a fragmentary plan view of another series of wrapper blanks whose paired handle sections each have three staples applied thereto;

Fig. 32 is a plan view of the stapling arm oscillating cam whose cam track is shaped to insure the application of three staples to each pair of handle sections of a series of continuously traveling wrapper blanks as indicated in Fig. 31;

Fig. 33 is a fragmentary plan view of a series of adjacent wrapper blanks whose paired handle sections have four staples applied thereto;

Fig. 34 is a plan view of the stapling arm oscillating cam whose cam track is formed to insure application of four staples to each pair of handle sections during continuous travel of the wrapper blanks as indicated in Fig. 33; and Figs. 35A, 35B, 35C, 35D, 35E, 35F, 35G, 35H, 35I and 35J illustrate some of the varied forms of blank parts which may be stapled together in successive order by the use of the stapling apparatus of this invention, synchronized to operate in association with a continuously traveling work conveyor, with the staples applied in close proximity to the crotch line of the parts to be secured together.

Similar reference characters refer to similar parts throughout the several views of the drawings and specification.

As shown in the accompanying drawings, the stapling apparatus of this invention generally comprises a stapling arm 1 with which the staple former 10, staple driver 20 and staple clinching block 52 is associated. The stapling apparatus also generally includes mechanism 60 for oscillating the staple driving end of the stapling arm 1 in timed synchronism with the staple former and driver. In addition, the stapling apparatus includes wire feeding mechanism 100 operating in synchronism with the oscillating movement of the stapling arm.

As shown in Figs. 7, 8, 11 and 13, the stapling arm 1 comprises an elongated casing member 2 which extends at right angles from the main drive shaft 80 and is of sufficient length to place the staple driving end thereof adjacent the workpiece being transported on the workpiece conveyor. The elongated casing member 2 may be generally channel shaped in cross section to provide a bottom guide wall 3 and spaced upwardly extending side walls 4. The bottom guide wall 3 is joined as by a stiffening web 5 to a hub section 6 which encloses an end section of the main drive shaft 80. The hub section 6 is journaled on the main drive shaft 80 by spaced ball bearing units 7 and 8. The hub section 6 also has a laterally offset section 9 designed to contain certain parts of the operating mechanism 60 which oscillates the stapling arm. The elongated casing member 2, the hub section 6 and offset section 9 together provide a composite casing or housing which may be made of fabricated or cast metal and which is journaled on and swingably supported by the main drive shaft 80.

The stapling arm construction

The elongated casing member 2 of the stapling arm is designed to contain within the channel shaped body thereof the staple former 10, the staple driver 20, the wire cutting blade 17 and associated wire shearing block 41, and the driving devices which operably connect the staple former 10 and staple driver 20 to the main drive shaft 80 of the stapling apparatus. A staple clinching block 52 is also mounted on the outer end of the stapling arm casing section 2.

As shown more particularly in Figs. 8 and 13 to 18 inclusive, the staple former 10 comprising a staple forming bar 11 which is guided in its reciprocating movement by the bottom wall 3 of the casing member 2. As shown more particularly in Fig. 13, the bottom wall 3 of the casing member presents overhanging lip portions 11" which define an undercut guide channel 11' in which the staple forming bar 11 is designed to reciprocate. The staple forming bar 11 is also supported by a relatively thin bottom plate 12 which is secured as by screws 12' to the underside of the bottom wall 3 of the stapling arm casing member 2. To insure smooth reciprocating movement of the staple forming bar 11 within the guide channel 11' of the casing member 2, an adjustable facing plate 13 is set within the guide channel 11' and presents a flat side surface 13' against which the adjacent side edge of the staple forming bar 11 may smoothly slide. The facing plate 13 may be made of hard wear resistant metal and may be adjustably maintained in guiding contact with the side face of the staple forming bar 11 by means of a series of set screws 14 as shown in Figs. 7 and 13 which are threaded through the adjacent side wall 4 of the casing member 2 and may be adjusted from time to time as the staple forming bar 11 is worn to thereby maintain the bar 11 in snug sliding position within the guide channel 11'.

As shown in Figs. 8 and 9 and Figs. 13 to 18 inclusive, the staple forming bar 11 also has a guide channel 15 in its bottom face which extends longitudinally thereof and which receives the staple driving bar 21 of the staple driver 20, the staple driving bar 21 being enclosed within the guide channel 15 by the thin bottom plate 12. The staple engaging end of the staple forming bar 11 is provided with a pair of spaced leg portions 16 extending beyond the terminal end 16' of the midsectional portion of the staple forming bar 11. One of the leg extensions 16 has a hard metal staple cutting blade 17 inset therein as shown in Figs. 14 and 16 and secured thereto by screws 17'.

The outer ends of both leg extensions 16 each has a groove 18 extending transversely thereof and of such size as to receive therein a length of staple forming wire s. The aligned wire receiving grooves 18 present continuations 18' which extend longitudinally of the leg extensions 16 directly adjacent the driving bar guiding faces thereof so that the grooves are partly enclosed by the adjacent side faces of the staple driving bar 21 when the staple driving bar is extended thereover. The stapling wire receiving grooves 18 and groove extensions 18' are also located directly adjacent the underface of the leg extensions 16 as shown in Figs. 16 and 17 so that the grooves are further enclosed by the inside face of the bottom plate 12 when the staple forming bar 11 is advanced. In operation, an end section of the stapling wire is inserted through the transversely aligned wire receiving grooves 18 in the leg extensions 16 so that when the staple forming bar is advanced, a wire section of staple length is cut by the cutter blade 17 thereof.

The staple driver 20 comprises an elongated bar 21 designed to snugly slide in the guide channel 15 formed in the staple forming bar 11. The staple driving bar 21 has an end extension 21' which is secured to a head plate 22 as by screws 22' as shown in Figs. 14 and 15. As thus secured, the underface 21'' of the staple driving bar 21 is flush with the underface 22'' of the head plate 22 as shown in Fig. 15. A cam roller 23 is rotatably mounted on a roller pin 23', the roller pin 23' being removably attached to the inner end of the head plate 22 by a clamp plate 24 secured to the plate 22 as by a clamp bolt 24'. The cam roller 23 is designed to roll in contact with a cam plate 37 which operates to reciprocate the staple driving bar 21 within the groove 15 of the staple forming bar 11.

The staple driving end of the staple driving bar has a hammer plate 25 inset into the underside thereof and secured thereto as by screws 25' to permit adjustment, removal and replacement thereof when worn. The hammer plate 25 presents a staple striking end face 26 having a thickness approximately equal to the diameter of the adjacent wire receiving groove extensions 18' and a width equal to the width of the staple forming bar 21 to which it is attached as shown in Figs. 15 and 16. The staple driving end of the staple driving bar 21 is also provided with a tapered cam surface 26' which tapers from the striking end 26 of the hammer plate 25.

The hammer plate 25 of the staple driving bar 21 is normally held in retracted position within the guide channel 15 of the staple forming bar by means of a tension spring 27, one end of which is attached to a stud 28 secured to the staple driving bar 21 immediately to the rear of the hammer plate 25. The attaching stud 28 extends through an enlongated slot 28' formed in the staple forming bar 11. The other end of the tension spring 27 is secured to a stud 29 which is attached to the staple forming bar 11 as shown in Figs. 14 to 18 inclusive. The tension spring 27 also serves to maintain the driving bar cam roller 23 in camming engagement with the cam plate 37.

The staple forming bar 11 is reciprocated by a crank arm assembly 30 as shown more particularly in Figs. 7 and 8. The crank arm assembly 30 comprises a connecting rod 31 adjustably secured to a wrist bearing 32 containing a bearing sleeve 32' through which a wrist pin 33 extends. The wrist pin 33 is threaded to or otherwise secured to the staple forming bar 11 as shown in Figs. 8 and 15. The other end of the connecting rod 31 is adjustably secured to a similar wrist bearing 34 having a bearing sleeve 34' through which a wrist pin 35 extends. One end of the wrist pin 35 extends into an off-center hole 36 in the cam plate. The cam plate 37 may have the general egg shape as shown in Fig. 25, and presents a generally egg shaped camming periphery 37' against which the cam roller 23 mounted on the head plate 22 of the driving bar 21 is designed to roll when the cam plate 37 is rotated.

The cam plate 37 is attached to and rotated by the main drive shaft 80 of the stapling apparatus. As shown in Fig. 8, the reduced end portion 81 of the main drive shaft has a cap member 38 removably fixed thereto as by a removable attaching pin 38'. The cam plate 37 seats against the flat end face of the cap member 38 and the cam member 37 is centered on the longitudinal axis of the main drive shaft 80 by a centering pin 39. The projecting end of the wrist pin 35 is threaded into an off center socket hole 36' in the cap member 38 as shown in Figs. 8 and 11. Rotation of the main driving shaft 80 and the cam plate 37 as thus attached to the end thereof operates to reciprocate the staple forming bar 11 through the agency of the crank arm assembly 30. Rotation of the cam plate 37, whose camming edge 37' is maintained in contact with the cam roller 23 by the tension spring 27, also operates to reciprocate the staple driving bar 21 in operating synchronism with the reciprocating movement of the staple forming bar 11.

The elongated channel shaped casing member 2 within which the staple former 10 and staple drive 20 reciprocate, is provided with an end wall 40 at the staple driving end thereof which may be cast integral with the side walls 3 thereof, as shown in Figs. 7, 8 and 18. A stationary wire shearing block 41 is set within a transversely extending slot formed in the end wall 40 and rests upon the inside surface of the bottom plate 12 attached to the casing member 2. The wire shearing block 41 presents a wire receiving groove 42 in the bottom face thereof which is closed by the bottom plate 12. The shearing block 41 also presents a wire shearing end face 43 against which the cutting edge of the wire cutting knife 17 may shear as shown in Figs. 26C, 26D and 26E and thereby cut off a staple forming end section s of the stapling wire. The wire shearing block 41 is adjustably clamped in position by a clamp plate 44 to which a clamp bolt 44' is threaded. As shown in Figs. 9 and 19, the clamp bolt 44' extends in a longitudinal direction through the end wall 40 of the casing member 2. The end wall 40 may also be provided with an access opening 44'' through which a suitable tool may be inserted to manipulate the attaching screws 17' which attach the cutter knife 17 to one of the leg extensions 16 of the staple forming plate 11.

The end wall 40 of the casing member 2 also contains a staple shaping anvil pin 45 as shown in Figs. 8, 9 and 19 which is designed to slide within a bore 45' extending through the end wall 40 at right angles to the upper face of the staple forming bar 11. One end of the anvil pin 45 is provided with a head portion 46 which slides within an enlarged bore cavity 46' formed in the end wall 40. A compression spring 47 seats against the head portion 46 and is retained within the enlarged bore cavity 46' by an abutment plate 48 secured as by screws 48' to the upper edge face of the end wall 40.

The inner end of the anvil pin 45 presents flat side faces 49 which permit the anvil and to snugly project between the inner guide faces of the leg extensions 16 of the staple forming bar 11 as shown in Fig. 18. The free end of the anvil pin 45 presents a cam face 50 against which the tapered end face 26' of the staple driving bar 21 is designed to cam. The cam face 50 of the anvil pin 45 is also provided with a transversely extending wire receiving groove 51 which has a flared mouth 51' as shown in Fig. 9 to facilitate entry of the advance end of the stapling wire into and through the wire guiding groove 51.

When the striking end 26 of the hammer plate 25 as mounted on the end of the staple driving bar 21 is in retracted position as shown in Fig. 8, the compression spring 47 will project the cam end of the anvil pin 45 in such position as to place the wire guiding groove 51 therein in the plane of the transverse wire receiving grooves 18 formed in the leg extensions 16 of the staple forming bar 11. A staple length section of wire can then be projected through the groove 51 of the anvil pin 45 as shown in Fig. 9. When a staple length wire segment has thus been positioned, it is cut by the wire cutting blade 17 when the staple forming bar 11 is advanced, as shown in Figs. 26D and 26E. When the wire segment has thus been cut, the leg extensions 16 of the staple forming bar 11 will telescope over the flat faces 49 of the anvil pin 45 to bend the staple segment into U-shaped form, the side legs of the staple being shaped by the groove extensions 18'. When the staple has thus been shaped, the staple driving bar 21 advances so that the striking end 26 of the hammer plate 25 engages the connecting leg of the staple and thereupon drives the staple side legs into the workpiece. As the staple driving bar 21 advances, the cam face 26' thereof cams against the cam face 50 of the anvil pin 45 to retract the anvil end of the anvil pin from its projected position between the leg extensions 16 of the staple forming bar 11.

The staple clinching block 52 as shown in Figs. 7, 8, 9 and 18 may comprise a main block section 53 which may be secured by any suitable securing means 53' to the end wall 40 of the stapling arm casing member 2. An auxiliary block section 54 is mounted by a tongue-groove connection in the main block section 53 and may be secured thereto by bolts 54' extending through the auxiliary block section 54. The outer face of the casing end wall 40 is provided with a depression which forms an open slot 55 into which elements *e* of the workpiece may project. The adjacent faces of the open slot 55 serve to guide and align the workpiece elements *e* into overlapped relation during the stapling operation. It will be appreciated that the workpiece element receiving slot 55 may be made of any width and height, and may be of such size as to completely separate the adjacent faces of the end wall 40 and the staple clinching block 52 to properly receive the workpiece elements *e* therein, in which case the staple clinching block 52 would be secured to the staple arm casing member 2 by non-obstructing spanner elements.

The auxiliary block section 54 is designed to support a hard metal anvil plate 56 having suitable staple leg clinching depressions 56' formed therein. The anvil plate 56 may be fitted in a dovetailed recess in the auxiliary block section 54 and locked against vertical movement therein by a lock screw 57 the cone point of which projects into a V groove in the anvil plate 56. The lock screw 57 thus permits ready removal and replacement of the anvil plate 56.

The channel shaped stapling arm casing member 2 may be suitably enclosed by a removable cover 58 having an end enclosing wall portion 58' as shown in Figs. 7 and 8. The cover plate 58 may be removably secured to the casing member 2 as by screws 59 threaded into the side walls 3 thereof.

*Stapling arm oscillating mechanism*

The mechanism 60 for oscillating the stapling end of the stapling arm 1 in timed synchronism with the continued advance of the workpieces on the traveling conveyor is in part contained in the offset casing section 9 of the composite casing housing which is swingably mounted on the end of the main drive shaft 80 as hereinbefore stated. The stapling arm oscillating mechanism 60 includes a cam wheel 61 as shown in Figs. 7, 8 and 11 having a continuous cam track 62 formed therein which may be variously shaped as illustrated in Figs. 24, 30, 32 and 34 and hereafter more fully described. The cam wheel 61 may be secured to an underlying gear wheel 63 as by screws 63'. The gear wheel 63 is mounted to mesh with a driving gear 64 secured as by a lock pin 64' to the reduced end portion 81 of the main drive shaft 80. The size ratio of the gear wheel 63 and driving gear 64 is such as to rotate the cam wheel 61 at the proper speed.

The cam wheel 61 and gear wheel 63 are fully enclosed and contained within the offset casing section 9 and an associated cover casing section 9' of semicircular form which are removably secured together as by tie bolts 9'' as shown in Fig. 7. The cam wheel 61 and gear wheel 63 are both rotatably supported by a stub shaft 65 which is mounted to rotate in a lower bearing unit 66 and an upper bearing unit 67. The lower bearing unit 66 is set within a conforming hole formed in the laterally extending bottom wall 68 of the offset casing sections 9—9' and is held in position by a closure plate 68' secured to the bottom wall 68 as by screws 68''. The offset casing section 9 and the associated semicircular cover casing section 9' together present an enclosing side wall 69 and a top wall 70 as shown in Figs. 7 and 11.

The top wall 70 has a conforming hole in which the upper ball bearing unit 67 is seated and held in position by a bearing mounting plate 70' secured as by screws 70''. The upper end of the stub shaft 65 may be threaded to receive a locknut 65'. The cam wheel 61 and associated gear wheel 63 may be readily removed and replaced by a cam wheel having a cam track 62 of modified form, by simply detaching the cover casing section 9', detaching the bearing mounting plates 68' and 70', and removing the locknut 65' to permit the stub shaft 65 to be withdrawn.

A cam roller 71 projects through an opening 71' in the top wall 70 of the casing section 9' as shown in Figs. 7 and 11. The cam roller 71 is designed to roll in the cam track 62 of the cam wheel 61 and is journaled on a pin shaft 72 which is fixed to a collar portion 74' formed on the end of one arm 74 of a bell crank lever 73. The heel of the bell crank lever 73 has a bearing collar 75 which receives a bearing pin 75' secured to the top wall 70 of the offset casing section 9. The other arm 76 is adjustably secured to one end of an adjustable connecting rod 77 as by a wrist pin 78. The other end of the connecting rod 77 has a threaded and adjustable extension 77' which is swingably attached as by wrist pin 79 to a fixed bracket 79' which may be attached to an overhead cross frame 223 of the conveyor.

It will be appreciated by referring to Fig. 7 that the bell crank lever 73 rocks on the heel bearing pin 75' in accordance with the oscillating movement transmitted to the bell crank lever arm 74 by its cam roller 71. The lever arm 74 also oscillates in accordance with the shape formation of the continuous cam track 62 during rotation of the cam wheel 61. Since the other lever arm 76 of the bell crank lever 73 is swingably tied to a fixed frame member 223 of the conveyor, rocking movement of the oscillatable arm 74 serves to transmit a corresponding lateral oscillation to the heel of the bell crank lever 73 and to the stapling arm 1 as indicated by the direction arrows *w* in Fig. 7.

Since the stapling arm 1 and its associated stapling arm casing section 2 is swingably mounted on the main drive shaft 80 as by the paired ball bearing units 7 and 8, and since the stapling arm itself is relatively light in weight, little resistance to the oscillating movement of the stapling arm is encountered, and it may be practically oscillated at a speed of several hundred oscillations per minute without noticeable wear of the operating parts. Successive stapling operations at speeds of over one hundred and fifty stapling operations per minute may be effectively, positively and reliably performed when the stapling end of the stapling arm is oscillated through a relatively small arc of substantially no more than two inches and usually in the order of approximately one inch or less.

*Drive shaft mounting*

The main drive shaft 80 of the stapling apparatus as shown more particularly in Figs. 6, 8 and 11 is rotatably mounted on a bearing block 82 containing a pair of spaced thrust bearing units 83. The bearing block 82 is pivotally supported between the arms 84 of a sturdy supporting bracket 85 which may be fixedly secured to a frame member 227 of the workpiece conveyor. Pivotal support for the bearing block 82 may be provided by a pair of pivot bolts 86 pivotally mounted on the bracket arms 84 and secured to lug extensions 82' of the bearing block 82. The bearing block 82 and the main shaft 80 supported thereby may be releasably retained in operating position as shown in Fig. 8 by a draw bolt 87 whose shank may extend through a web portion 85' of the bracket 85 and whose end may extend into a threaded hole in the bearing block 82. A micrometer set screw 89 threaded through the web portion 85' of the supporting bracket may also be provided to align the position of the main shaft 80 so that the operating end of the stapling arm 1 may be accurately positioned with respect to the workpiece to be operated upon.

The lower end of the main drive shaft 80 is provided with a projecting tongue portion 81' adapted to be connected by a coupling 90 as shown in Figs. 8, 10 and 13 to the free end of an auxiliary driven shaft 233 which may be a stub shaft driven from the main drive shaft 230 of the workpiece conveyor as indicated in Fig. 6. The coupling member 90 may have a diametrical slot 91 therein in which the end of the shaft tongue 81' projects. The coupling 90 may be locked to the auxiliary shaft 233 by means of a spline element 92 set within a conforming groove cut in the free end of the shaft 233 and whose ends project through the diametrical slot 91 in the coupling 90 so that the coupling 90 rotates with the rotation of the stub shaft 233, but nevertheless permit swinging detachment of the tongue portion 81' of the main shaft 80 therefrom when the bearing block 82 and the main shaft 80 supported thereon is swung away from the workpiece conveyor on the pivot bolts 86. The auxiliary shaft 233 may be supported in fixed position by a bearing bracket 233' fixed to a side frame 207 of the workpiece conveyor as shown in Fig. 8.

The drive shaft mounting as above described permits the entire stapling apparatus, including the stapling arm 1, and its associated casing member 2, staple former 10, staple driver 20, staple clinching block 52, as well as the entire stapling arm oscillating mechanism 60 and the shaft associated drives therefor, to be swung away from the workpiece conveyor on the pivot bolts 86 and into the position shown in dot and dash lines in Fig. 8, in which position all parts are conveniently accessible for adjustment and repair. All that is necessary to release the stapling apparatus so that it may be swung into repair position, is to first disconnect the wrist pin 79 from the connecting rod extension 77' as shown in Fig. 7, rotate the main shaft 80 so that the flat faces of its tongue extension 81' may be swung out of the coupling slot 91, and release the draw bolt 87 from the bearing block 82. By making these three simple mechanical adjustments, which may be executed in two or three minutes, the entire stapling apparatus may be swung completely away from the workpiece conveyor and all parts of the apparatus rendered readily accessible for adjustment, replacement or repair.

*Wire feeding mechanism*

The wire feeding mechanism 100 of this invention is designed to automatically supply staple length sections to the stapling end of the stapling arm 1 in synchronized relation to the oscillating movement thereof. As will be more fully explained hereafter, a staple length segment of wire is projected through the wire groove 51 of the anvil pin 45 when the stapling arm moves in a direction opposite to the traveling workpieces. Just after the stapling arm leaves the fully returned position, a wire segment is cut, and during continuing advance movement of the stapling arm at the forward speed of the workpiece, the staple is formed and driven into the workpiece. During this advance movement of the stapling arm, a following length segment of wire is withdrawn from the wire roll S and placed in position to be telescoped into the wire groove 51 of the anvil pin 45 during return movement of the stapling arm.

Referring more particularly to Fig. 9 and Figs. 19 to 23 inclusive, a continuous strand of wire S is supported in roll form on a wire spool 101 presenting side walls 102 and a core 103 on which the wire is wound. The spool 101 is rotatably mounted on a shaft 104 which extends through the side plates 102. The spool shaft 104 may be suitably supported on a bracket 105 having on the upwardly projecting supporting arm 106 connected to a base section 107 which may be suitably secured to an overhead cross frame 223 of the workpiece conveyor. The bracket arm 106 receives the threaded end of the spool shaft 104 and is secured thereto as by nut 104'.

To provide the desired degree of resistance to the rotation of the wire spool 101, a friction bushing 108 may be disposed between the bracket arm 106 and the adjacent side wall 102 of the spool. A friction cap 109 telescopes over the projecting extension 110 of the spool shaft 104 and is provided with resiliently flared feet 109' designed to bear against the adjacent side wall 102 of the spool. The cap member 109 may also contain a stiffening collar 111 as shown in Fig. 21 which is fixed against rotation by a pin 111' extending therethrough and which also projects through a slot 112 extending longitudinally of the shaft extension 110. A compression spring 113 seats against the friction cap 109 and the frictional pressure exerted by the flared feet 109' thereof against the adjacent side wall 102 of the spool may be adjusted as desired by an adjusting nut 114 threaded on the outer end of the shaft extension 110. The pulling force required to rotate the spool and thereby successively withdraw predetermined staple length sections therefrom can thus be regulated in accordance with operating requirements.

The lead end of the wire S as it leaves the reel is drawn over the outer belly of arcuate shaped guide plate 115 and is guided thereon by a pair of spaced eyelets 116 and 116' attached thereto. The lower end of the arcuate plate 115 is pivotally mounted on a stud bolt 117 secured to a supporting plate 118 which may be attached to the base section 107 on the spool mounting bracket 105. Tension is placed on the wire S being drawn over the outer belly of the curved guide plate 115 by a spring 119 which presses against the guide plate 115, as shown in Fig. 20. The wire strand leaves the guide plate 115 through the aligning eyelet 116' and is then straightened so that substantially straight staple segment sections are supplied to the stapling arm.

The wire straightening devices as shown in Figs. 20 and 22 may comprise a series of staggered straightening rollers 120, 121, 122 having aligned grooves 124 in the periphery thereof. The straightening rollers 120, 121 and 122 are each supported on a stud pin 125 attached to mounting plate 126. The mounting plate 126 may be adjustably secured to the supporting plate 118 which is attached to the base section 107 of the spool supporting bracket 105. It will be noted by referring to Fig. 20 that the straightening rollers 120, 121 and 122 are arranged in alternately staggered relationship with respect to the wire strands threaded therebetween. A sufficient number of straightening rolls may be provided to insure adequate straightening of the wire strand.

The wire strand leaving the straightening rolls 120, 121 and 122 in straightened form is then drawn through a wire gripper device 130 which is constructed to prevent any return movement or back lash of the wire as intermittently withdrawn in rapid succession from the wire spool 101.

The wire gripper device 130 as shown in Figs. 20, 22 and 23 may comprise a grip plate 131 of hard metal pivotally mounted as by pin 132 to a support plate 133 fixed as by screws 133' to the support block 118. The support plate 133 has a wire receiving groove 134 formed by a shoulder portion 135 and a feed section 138' of a guide plate 138. The grip plate 131 has a sharp corner 131' as shown in Fig. 22 designed to engage the body of the wire as it is drawn through the groove 134. The grip plate 131 is so formed and mounted on pivot pin 132 that the wire can be readily drawn towards the stapling arm 1 but is prevented from backward movement towards the spool 101. The grip plate 131 has a tension spring 137 which may encircle the hinge pin 132, with the ends thereof engaging a side of the grip plate 131 and a side of the support plate 133 to maintain the corner 131' of the grip plate 131 in contact with the wire at all times.

The wire leaving the gripper device 130 is drawn between a pair of guide plates 138 and 139 of relatively large radius. The paired guide plates 138 and 139 define a wire receiving groove 140 therebetween as shown in Figs. 7, 19, 19A and 20. The paired guide plates 138 and 139 may be secured together as by screws 141 as shown in Figs. 19 and 19A. The underlying guide plate 138 may be provided with a feed end extension 138' which may be secured as by a bracket 142 to the lower end of support block 118. The discharge end of the paired guide plates 138 and 139 may be secured to a fork bracket 143 secured to one end of a mounting rod 144 as by hinge pin 146. The other end of mounting rod 144 has a threaded section 144' which extends through a bracket element 147 which may be secured to the base section 107 of the spool supporting bracket 105. The threaded section 144' of the mounting rod has a pair of adjusting nuts 148 and 149 which may be manipulated to adjust the discharge end of the paired guide plates 138 and 139 so that the wire groove 140 therein will be positioned in aligned relation to the wire receiving groove 42 in the wire shearing block 41.

The advance end of the wire leaving the discharge end of the paired curvilinear guide plates 138 and 139 is thus positioned to direct the wire into the wire receiving groove 42 of the shearing block 41 mounted in the end wall 40 of the stapling arm 1 as previously described. A second wire gripping device 150 as shown in Figs. 7, 19 and 20, is attached to the adjacent side wall 3 of the stapling arm to oscillate therewith. The gripping device 150 serves to grip the end section of the wire and advance the wire along with the advance swing of the stapling arm, but to disengage the wire when the stapling arm makes the following return swing. The gripping device 150 may comprise a wire grip plate 151 which has a sharp corner 151' designed to engage the body of the wire and is pivoted on a pin 152 secured in a laterally extending plate 153 which is secured on the stapling arm 1 by screws 153'. A striker plate 154 is attached on the underside of plate 153 as by screws 154' so that the wire passes between the edge of striker plate 154 and the corner 151' of grip plate 151 as shown in Fig. 9. The plates 153 and 154 and the grip plate 151 are so proportioned and positioned as to place the wire, as telescoped therethrough, in aligned relation with the wire receiving groove 42 of the wire shearing block 41. The grip plate 151 also has a tension spring 157 which may be wound around its pivot pin 152 with one end thereof secured to the side edge of the grip plate 151 and the other end thereof secured to the plate 153.

The grip plate 151 is pivotally mounted in such manner as to grip the wire and draw a staple length section of the wire from the spool 101 when the stapling arm 1 makes an advance swing. When the stapling arm 1 makes its return swing, the grip plate 151 releases its grip on the wire so that the grip plate 151 and striker plate 154 are free to telescope over the next following staple length section of the wire. The wire gripping device 130 offers no interference to withdrawal of successive staple length sections of wire from the spool 101, but cooperates with the wire gripping device 150 to prevent any backlash or wire return to the spool. Conversely, the wire gripping device 150 grips the wire with each advance swing of the stapling arm 1 to thereby advance successive wire length sections of wire during each advance swing of the stapling arm but interposes no obstruction to the return swing of the stapling arm.

*Operation of stapling apparatus*

The staple forming bar 11 as reciprocated by the crank assembly 30 and the staple driving bar 21 as reciprocated by the cam member 37 each make a complete advance and return stroke during each rotation of the main drive shaft 80. The stroking movements of the staple forming bar 11 and the driving bar 21 are synchronized to first cut a staple length section of wire, shape the staple length section into staple form, and thereupon driving the staple into the work piece and substantially simultaneously clinch the legs thereof in successive order during the advance swing of the staple arm. During the advance swing of the stapling arm, a following staple length section of wire is also advanced to provide the next succeeding staple. During the return swing of the stapling arm, the wire receiving groove 42 in the wire shearing block 41 and the wire receiving groove 51 in the staple shaping anvil pin 45 are successively telescoped over the advanced staple length section of the wire so that when the stapling arm has compelted its return swing, a staple length section of wire is in position for cutting.

For a better understanding of these successive operations, reference is made to Fig. 26A through Fig. 26F inclusive. Fig. 26A shows the position of the operating parts of the stapling arm upon completion of the stapling driving and clinching operation, which is completed when the stapling arm has completed its advance swing. At this point in the operation, the striking end 26 of the staple driving bar 21 has driven the staple S through the work piece elements e and the side legs of the staple have been clinched over by the clinching action of the clinching plate 56 set in the staple clinching block 52 forming a part of the stapling arm. At the completion of the clinching operation, a following staple length section of wire will reside in the wire receiving groove 42 of the wire shearing block 41.

At the initiation of the return swing of the stapling arm as shown in Fig. 26B, the staple engaging end of the staple forming bar 11 and the staple driving bar 21 will be free to be immediately retracted and the anvil pin 45 will be pressed downwardly by its associated compression spring 47 so as to place the wire receiving groove 51 thereof in the plane of the transverse wire receiving grooves 18 at the end of the leg extensions 16 of the staple forming bar 11.

As the stapling arm continues its return swing, the advanced staple length section of wire, held against backlash return to the wire spool 101 by the wire gripping device 130, will be telescoped into the wire receiving groove 51 of the staple shaping anvil pin 45 as shown in Fig. 26C. When the stapler arm has completed its return swing movement, the advanced staple length section will have been fully telescoped through the wire receiving groove 51 of the anvil pin 45 and will be in position for forming as shown in Fig. 26D, and a following staple length section of wire will also be placed in position within the groove 42 of the wire shearing block 41 as shown in Fig. 26D.

When the stapling arm has substantially completed its return swing, the staple forming bar 11 will be advanced so that the staple cutting blade 17 fixed to one of the leg extensions 16 thereof, will be in position to shear off the advanced staple length section adjacent the shearing end face 43 of the shearing block 41 as shown in Fig. 26D.

During the initial advance swing of the stapling arm as shown in Fig. 26E, the cutting blade 17 will have sheared off the advanced staple length wire section, and during continued advance swing of the stapling arm the staple forming leg extensions 16 of the staple forming bar 11 will telescope over the anvil end of the anvil pin 45 so as to bend the staple into U-shaped form as shown in Fig. 26E, with the staple side legs fitted within the longitudinally extending groove extensions 18' formed in the adjacent inside guide faces of the leg extensions 16.

During continued advance swing of the stapling arm, the free ends of the leg extensions 16 will also be brought closely adjacent to the work piece elements e by the advance movement of the staple forming bar 11 as shown in Fig. 26F. During the later stage of advance swing, the stapling driving bar 21 will also be advanced so as to place the striking end 26 thereof into contact with the connecting leg of the staple s as shown in Fig. 26F. During the final increment of advance swing of the stapling arm, the legs of the U-shaped staple will be instantaneously driven through the work piece elements e, and the staple side legs will be simultaneously clinched over by pressure contact with the clinching depressions 56' of the clinching plate 56 as shown in Fig. 26A.

The advance and return swing oscillations of the stapling arm is effected by the cooperative action of the cam wheel 61 and the bell crank lever 73. The cam wheel 61 as shown in Fig. 24 is geared to make only one complete revolution during the period in which the stapling forming arm 11 and staple driving arm 21 make four complete reciprocating movements. The cam track 62 in the cam wheel 61 shown in Fig. 24 is shaped to oscillate the stapling arm through only two advance and return swing movements during two successive reciprocating strokes of the staple forming bar 11 and stapling driving bar 21, and then to leave the stapling arm non-swinging and stationary during the following two reciprocating strokes of the staple forming bar 11 and stapling driving bar 21. The stapling arm 1 remains stationary only when it has completed an advance swing, and at this point no staple forming or driving operation can be executed, since there is no staple length section of wire in position within the guide groove 51 of the anvil pin 45 on which the reciprocating staple forming bar 11 and staple driving bar 21 can operate. Thus, when a cam wheel 61 having a cam trace 62 shaped as shown in Fig. 24 is used, the staple former 10 and staple driver 20 operates to form and drive two successive staples during two successive strokes thereof, but neither form nor drive any staple during the third and fourth strokes thereof as the cam wheel 61 completes one full rotation.

The cam track 62 is so shaped as to oscillate the stapling arm in a manner so that the stapler former 10 and the staple driver 20 can effectively execute the successive or intermittent staple cutting, staple forming, staple driving and staple section advancing operations, as diagrammatically illustrated in Figs. 26A to 26F inclusive. The cam track 62 and cam wheel 61 as shown in Fig. 24 is shaped and designed to make one complete rotation while the staple former 10 and staple driver 20 execute two successive staple cutting, forming and driving strokes, followed by two successive idling strokes.

Assuming the cam wheel shown in Fig. 24 is rotated in the direction of the arrow thereon and the cam roller 71 of the bell crank lever 73 is in operative position within the cam track 62, the stapling arm will have been swung to its fully returned position when the cam roller 71 is located in the approximate section 62a of the cam track, in which position the advance section of wire will have been fully projected through the guide groove 51 of the anvil pin 45 as shown in Fig. 26D. During continued rotation of the cam wheel 61, the cam roller 71 will travel through the track section 62b to thereby transmit an advance swing to the stapling arm. During the first instant of advance swing, the staple length wire section is first cut off, and during continued advance swing, the wire segment is bent into U-shaped form as generally indicated in Fig. 26E. During further advance movement of the cam roller 71 through the track section as generally indicated at 62b, the stapling end of the stapling forming bar 11 will have moved adjacent to the work piece element e and the striking end 26 of the stapling driving bar 21 will be in driving engagement with the staple as shown in Fig. 26F. During the central portion of the advance movement of the stapler arm, the staple driving bar 21 will drive the staple through the paired work piece elements e and the side legs of the staple will be clinched as shown in Fig. 26A.

During the final advance movement of the stapler arm the forming bar 11 and driving bar 21 are retracted, and guide groove 51 drops into alignment with the lead end of the wire section for stable #2 in shearing block 41, as shown in Fig. 26B. The cam roller 71 at the end of the advance movement of the stapler arm reaches the track section 62c in cam 61.

When the cam wheel 61 is further rotated, the cam roller 71 will move through the track section 62d to give the stapling arm a return swing and during this return swing, the advance end of the wire is telescoped through the guide groove 51 in the anvil pin 45 as shown in Fig. 26C. When the stapling arm reaches the end of its return swing, a staple length section of wire will have been projected through the guide groove 51 in the anvil pin 45 as shown in Fig. 26D. Upon completion of the return swing, the cam roller 71 will have reached the track section 62a', and the staple forming bar 21 will have advanced to place the cutting knife 17 in position to cut off the second wire section as shown in Fig. 26D.

Continued movement of cam 61 causes the cam roller 71 to move through the track section 62b', the second staple is cut, formed, driven and clinched as shown in Figs. 26E, 26F and 26A and when the cam roller 71 reaches the track section 62c' the stapling arm again reaches its point of most advanced swing. During continued rotation of cam 61 through an arcuate distance of about 180° the cam roller 71 will travel through the semi-circular track section 62e and the stapler arm remains stationary in its most advanced position. Thus during one complete rotation of the cam wheel shown in Fig. 24, two staples are formed and driven while the cam wheel 61 is rotated through an arc of approximately 180°, and during the remaining 180° of rotation the stapler arm remains stationary at the terminus of the advance swing thereof.

To further illustrate the relative movements of the former bar 11 and driver bar 21 in relation to the advance and return swings of the stapler arm, reference is made to the diagram shown in Fig. 27. This diagram also shows the relative positions of the reciprocating former bar 11 and driver bar 21 and also their relative positions at each stage of advance and return swing of the stapling arm during complete rotation of the cam wheel, and with the positions of the former bar 11 and driver bar 21 shown in Figs. 26A to 26F inclusive, indicated thereon, when using the cam wheel 61 having a cam track 62 as shown in Fig. 24.

Fig. 29 indicates the staple spacing which can be effected on a series of work pieces A while undergoing uninterrupted advance on a continuously traveling work piece conveyor, using a cam wheel 61 for oscillating the stapler arm which has a cam track 62 shaped substantially as shown in Figs. 24 and 30 designed to provide for two successive stapling cycles followed by two successive idler cycles. By employing a cam wheel having a cam track substantially as shown in Fig. 32 which provides for three successive stapler arm swinging cycles followed by only a single idler cycle, a series of three successive and equally spaced staples may be driven in successive series, with each series separated by a double spacing where no staple is driven. By using a cam wheel 61 having a cam track 62 shaped as shown in Fig. 34 which provides for four successive stapler arm swinging cycles and no idler cycle, the staples can all be driven in uniform equally spaced relationship as indicated by the work piece series shown in Fig. 33. It will thus be appreciated that by appropriately shaping the cam track 62 in the cam wheel 61, successive staples may be driven into the traveling work pieces at predetermined and uniformly spaced distances, or at variably spaced distances, or at any desired spacing.

This improved stapling apparatus permits attachment of staples to paired work piece elements $e$ closely adjacent to the crotch line. Figs. 35A to 35J inclusive illustrate by way of example some of the varied and different kinds and types of work pieces A which can be operated upon by this improved stapling apparatus and wherein the staples $s$ are driven and clinched to paired work piece elements $e$ within $\frac{1}{8}$ to $\frac{1}{16}$ of an inch above the crotch line $f$ which joins the stapled work piece elements $e$ to the adjacent flared work piece sections $d$.

The application of the staples $s$ closely adjacent to the crotch line $f$ is made possible by improved features possessed by the stapling arm. It will be noted that by referring to Figs. 8, 18 and 19, that the wire receiving grooves 18 and groove extensions 18' at the operating end of the staple forming bar, and the striking end 26 of the staple driving bar 21, are separated from the flared sections $d$ of the work piece by the thin bottom plate 12 only. Since the bottom plate 12 is made of strong wear resistant metal, the bottom plate 12 need be only $\frac{1}{16}$ to $\frac{1}{32}$ of an inch in thickness. The underface of the bottom plate 12 is smooth and free of all interfering projections, and can thus be placed substantially in contact with the outwardly flared sections $d$ of the work pieces, without interfering with the continuous travel of the work pieces thereunder. The stapling arm 1 may be made in any desired length to thereby reach over work pieces of considerable width and permit effective stapling of paired work piece elements which are spaced a considerable distance from the main drive shaft 80 of the stapling apparatus.

Stapling apparatus constructed in accordance with this invention as above described, may be associated with almost any type or kind of work piece conveyor, and operated in timed synchronism with the continued and uninterrupted advance of the workpieces on the conveyor. For example, this stapling apparatus may be associated with workpiece conveyors equipped with mechanism for cutting, folding, erecting and aligning sheet material sections during continuous travel thereof to form containers, cartons, wrappers and article carriers. Stapling apparatus constructed in accordance with this invention may also be driven in synchronized association with various types and kinds of article packaging and wrapping machines, where it is desired to apply uniformly spaced staples to the articles, workpieces or packages undergoing formation during continuous travel thereof on the supporting conveyor.

For the purpose of further illustrating the operating characteristics of this stapling apparatus there is shown in Figs. 1 and 2 a diagrammatic form of one type of continuously driven conveyor with which the stapling apparatus of this invention may be associated. The conveyor here shown is equipped with devices designed to apply a carrier wrapper around a group of cans. As shown in Fig. 3, the can wrapper operated upon may be formed from paperboard or fiberboard and may comprise a bottom panel $a$, a pair of side panels $b$ foldably connected thereto and designed to enclose a group of six cans $c$. A top panel section $d$ is foldably connected to each of the side panels $b$, and a handle forming section $e$ is foldably connected to each of the top panel sections $d$. The packaging machine as diagrammatically shown in Figs. 1 and 2 for purposes of illustration is designed to infold the top panel sections $d$ in overlying relation to the upper end of the can group as shown in Fig. 4, and then upturn the handle sectioins $e$ into paired relation. The improved stapling apparatus of this invention and shown associated with the package forming conveyor of Figs. 1 and 2, operates to apply two or more staples to the paired handle sections $e$ of the carrier wrapper closely adacent the crotch line $f$ thereof as shown in Fig. 4, to provide a packaged article A comprising the six cans $c$ fully enclosed and locked within the stapled carrier wrapper.

The package forming machine 200 shown in Figs. 1 and 2 may comprise a continuous conveyor belt 201 trained around belt supporting drums 202 and 204 positioned at the feed end and the discharge end of the conveyor belt. The belt supporting drums 202 and 204 are mounted on suitable drum supporting shafts 203 and 205 journaled on the framework structure of the conveyor. The conveyor belt 201 may also be provided with a series of equally spaced article guides 206 secured to and extending transversely of the belt to define article receiving compartments therebetween. The framework structure for the conveyor may be of any desired construction and may comprise a pair of side rails 207 as shown in Fig. 8, connected by a series of cross frames 28 and supported on a series of spaced legs 209. The upper article receiving run of the conveyor belt 201 may be supported to prevent sagging thereof by the provision of a backing plate 210 supported from the cross frames 209 by suitable pedestals 211 as shown in Figs. 1 and 8.

To assemble the can package as shown in Fig. 4, the bottom panel $a$ of the wrapper blank is placed on the upper run of the conveyor belt 201 between the compartments defined by transverse article guides 206 thereof, with the cans $c$ arranged in grouped relation on the bottom panel $a$ of each wrapper. The side panels $b$ of the wrapper are upfolded and retain in upwardly folded position by a pair of side guide belts 212 trained around side belt supporting sheaves 213 at the head end of the conveyor and around side belt supporting sheaves 214 at the discharge end of the conveyor as shown in Figs. 1 and 2. The inner run of the side belt 212 may be guided into contact with the side panels $b$ of the can wrapper blank by two pairs of cooperating guide rollers 215 and 216. Backing plates 212', supported on brackets 217' are provided for each guide belt 212.

A pair of top panel infolding plates 217 positioned on opposite sides of the conveyor line may be provided to infold the top panel sections $d$ of the wrapper blanks in overlying relation to the can groups during continuous travel of the can containing wrapper from the head end of the machine to the stapling apparatus as shown in Figs. 1, 2, 5 and 7. The infolding plates 217 may be suitably supported in fixed position as from the brackets 217' secured to the cross frames 208. The infolding plates 217 each present a vertical section 218 which initially engages the adjacent upwardly extending top panel section $d$ of the wrapper. The vertical sections 218 of the infolded plates 217 gradually merge into inwardly curving sections 219 which effect initial inward folding of the top panel sections $d$ of the wrapper blank, and which in turn merge into horizontally extending sections 220 which compress and compact the top panel sections $d$ of the wrapper blank into flat overlying relation to the upper ends of the can group contained in the wrapper. The infolding optrations of the top panel sections $d$ of the wrapper blank are executed during the continued and uninterrupted travel of the article packages undergoing assembly as supported by the continuously advancing upper run of the conveyor belt 201.

Means may also be provided to upfold the paired handle sections $e$ of the wrapper blank during inward folding movement of the top panel sections $d$ thereof. As shown in Figs. 1 and 2 and in greater detail in Figs. 5, 7 and 20, a vertically extending handle upfolding plate 221 may be positioned between the paired top panel infolding plates 217 to effect upward folding of the handle sections $e$ during the interval of travel of the wrapper blank between the inwardly curved sections 219 and the horizontal sections 220 of the infolding plates 217.

As will be appreciated by referring to Fig. 5, the handle sections $e$ of the wrapper blank will first strike the opposite sides of the upfolded plate 221 as the top panel sections *d* are being folded inwardly and their handle sections *c* will then fold along the crotch or fold lines *f*, thereof, which upfolding movement of the handle sections is further facilitated by the downward pressure exerted on the top panel sections *d* by the curved sections 219 and the horizontal sections 220 of the infolding plates 217 during continued advance of the can containing wrapper blank. When the upturned handle sections *e* have moved away from the discharge end 221' of the stationary upfolding plate 221, the paired handle sections *e* will thereafter brace against each other and remain upright and in position to advance through the workpiece element receiving slot 55 of the stapling arm when the paired workpiece elements *e* are stapled together. The upfolding plate 221 may be fixedly secured in operative position by means of an edge bar 222 as shown in Figs. 5 and 20, one end of which is secured as by bolt 222' to an overhead cross frame 223 of the framework structure. The cross frame 223 may be supported at the ends thereof by means of suitable brackets 224 to the adjacent lower cross frames 208 as shown in Figs. 7 and 8.

To provide rigid support for the inturned top panel sections *d* of the wrapper blank during the application of the staples to the paired handle sections *e* thereof, it is desirable to provide a skid plate 225 as shown more particularly in Fig. 5 which is positioned to directly overlie the advancing can group and over which the panel sections *d* of the wrapper blank are infolded. The head end 225' of the skid plate 225 may be upturned as shown in Fig. 5 and provided with a slit 225'' which receives the lower edge of the handle upfolding plate 221 as shown in Fig. 5. The skid plate 225 is of sufficient width to support both of the horizontally infolded top panel sections *d* of the wrapper so that the top panel sections will remain in alignment and firmly supported during application of the staples adjacent the crotch lines *f* of the upturned handle sections *e*. The skid plate 225 may be supported from the forward end thereof and in the area between the inwardly curving sections 219 of the infolding plate 217, by a suitable bracket 226 which is fixed to the handle upturning plate 221.

As diagrammatically illustrated in Fig. 6, the main drive shaft 230 of the workpiece conveyor may be provided with a bevel gear 231 which drives a companion beveled gear 232 fixed to the end of the stub shaft 233 to which the main shaft 80 of the stapling apparatus may be operably connected in the manner heretofore described. The main conveyor shaft 230 and the associated stub shaft 233 which operates the stapling apparatus may be driven in timed synchronism from a common power source such as a driving motor 235 and associated variable speed reducer 236 which rotates the main driving sprocket 237. The speed reducer 236 may be provided with suitable means 238 for adjusting and varying the speed at which the main driving sprocket 237 is driven. The main driving sprocket 237 may be operably connected as by a power transmission chain 239 to a driven sprocket 240 which is fixed to the main conveyor shaft 230.

The drum shaft 205 at the discharge end of the conveyor belt 201 may be driven from the main conveyor shaft 230 through any suitable driving mechanism. As shown in Fig. 6, such driving mechanism may comprise a bevel gear 231' which meshes with gear 232, a drive worm 241 fixed to the bevel gear shaft 230' and which meshes with a worm gear 242 fixed to the end of an auxiliary shaft 243. A driving sprocket 244 may be fixed to the auxiliary shaft 243 and connected to a driven sprocket 245 fixed to one end of the drum shaft 205 as by drive chain 246. The side belt supporting sheaves 214 at the discharge end of the conveyor may each be fixed to a vertically extending stub shaft 247 each having a beveled gear 248 fixed thereto which meshes with a beveled gear 249 fixed to the drum shaft 205. Thus the side belts 212 which upfold the side panels *b* of the can wrapper as shown in Figs. 1 and 2 may also be driven from the common power motor 235 through suitable power transmission connections so that the inner runs of the side belts 212 are advanced at substantially the same speed as the workpiece supporting conveyor belt 201.

The stapling machine of this invention may be associated with any type or form of workpiece conveyor, and it will therefore be appreciated that the workpiece conveyor above described is intended to illustrate only one form of conveyor which may be used. While only one stapling machine is shown associated with the workpiece conveyor in the accompanying drawings, it will be appreciated that two or more stapling machines constructed in accordance with the teachings of this invention may be associated with the workpiece conveyor, and may be variously arranged on either side of, or on both sides of, the conveyor as convenience and production requirements indicate.

It will also be appreciated that the main drive shaft 80 of the stapling machine may be mounted to extend in a substantially vertical direction, or in a horizontal direction, or at any desired inclination, to thereby place the stapling arm in accommodating position with respect to the conveyed position of the workpiece elements to be stapled together. By the use of one or more stapling machines, a single linear row of staples may be applied to the workpiece elements *e* adjacent the crotch line *f* as shown in Figs. 35A, 35B, 35F, 35H and 35I. By the use of two or more stapling machines constructed in accordance with this invention, and arranged on the same side or on opposite sides of the workpiece conveyor, with the stapling machines sufficiently spaced to permit unobstructed oscillating movement of the stapling arms, two linear rows of staples *s* may be applied adjacent the crotch line *f* of the workpieces during continuous travel thereof as shown in Fig. 35E. Where two linear rows of staples *s* are to be applied to continuously traveling workpieces constructed in the form shown in Fig. 35E, the stapling arm of one of the stapling machines may extend horizontally and in upright position to apply the upper row of staples, while the stapling arm of the other stapling machine may extend horizontally but in inverted position to apply the lower row of staples; the drive shafts of both stapling machines being suitably connected to appropriate driving devices associated with the workpiece conveyor.

By providing three or more stapling machines arranged in spaced relationship along the path of travel of the workpiece conveyor, three separate rows of staples *s* may be applied adjacent the crotch lines *f* of the traveling workpieces as shown in Fig. 35C. By employing four or more stapling machines having the stapling arms thereof suitably arranged in spaced relationship in the required horizontal, vertical or inclined positions, four separate linear rows of staples may be applied to continuously traveling workpieces shaped as illustrated in Figs. 35D, 35G and 35J.

It will thus be appreciated that one, two, three, four or more separate rows of staples may be applied at various locations to the continuously traveling workpieces by the employment of the required number of stapling machines constructed in accordance with the teachings of this invention, all of which may be operatively connected to one or more driven shafts or other driving devices associated with the workpiece conveyor, so that all the stapling machines may be driven in synchronism with the travel movement of the workpiece conveyor. Since the stapling arm, its associated arm oscillating mechanism, and its associated staple former and staple driver reciprocating mechanism, are all swingably supported on the main drive shaft 80 by means of ball bearing mounting units 7 and 8, and since the parts themselves are rather light in weight, there is very little inertia to the high speed oscillation of the stapling arm.

When the stapling arms are constructed in accordance with this invention, staples *s* may be applied to the workpiece elements within an eighth to three sixteenths of an inch of the crotch or bend line f defined between the overlapped workpiece elements e to be stapled together and the laterally flared sections d of the workpieces. This feature of the invention is particularly important when wrappers or other article enclosing blanks must be secured in tightly wrapped condition around the articles to prevent movement of the articles in the stapled enclosing wrapper or blank.

The stapling apparatus constructed in accordance with this invention may be designed to apply staples of almost any size, formed from wire which may be round, elliptical, rectangular or polygonal in cross sectional shape, and will apply staples to workpieces formed from fiberboard, paperboard, composition board, plastic, metal or any other sheet material through which the staple legs can be driven. The staples may be applied to the workpieces in accordance with any desired staple spacing, as indicated by way of example in Figs. 29, 31 and 33, by providing a stapling arm oscillating cam wheel 61 having a cam track 62 which is appropriately shaped for the purpose as heretofore described. It will also be appreciated that a continuous row of equally spaced staples as shown in Fig. 33 may be applied to traveling workpieces by the use of two stapling machines, each having a stapling arm oscillating cam wheel 61 whose cam track 62 is shaped as shown in Fig. 30. Thus any desired number of stapling machines constructed in accordance with this invention may be operated in synchronism with and arranged in spaced relation on either one or both sides of the workpiece conveyor to increase production output as desired.

The staple feeding mechanism of this invention also insures positive feeding of a staple length section of wire into the operating end of the stapling arm with each oscillating movement of the stapling arm, without relying on independently driven devices for feeding the wire segments to the stapling arm. The length of the wire staples required to form the desired staple is gauged and determined by the swing length of the staple forming and driving end of the stapling arm, which is in turn controlled by the shape of the cam track 62 in the stapling arm oscillating cam wheel 61. Thus the length of the cut staple forming wire segment, as well as the corresponding size of the staple formed therefrom, may be modified as desired by the simple substitution of a cam wheel 61 having the required track formation 62, which cam wheel substitution may be quickly made as is evident from the above description and the accompanying drawings. It will also be appreciated that the stapling machine of this invention may also be employed to apply staples to workpieces while in residence position at the stapling station, by merely disconnecting the bell crank lever 73 from the oscillating mechanism and providing independent means for intermittently advancing staple length segments of wire into the stapling end of the stapling arm.

The improved stapling apparatus of this invention is relatively simple in construction, is positive and foolproof in operation, and may be employed to apply staples either close to the crotch line of the workpiece elements or in any desired location thereon. This stapling apparatus is compact in construction, and occupies relatively little space, and therefore several stapling machines may be arranged along a relatively short section of the workpiece conveyor line. Stapling apparatus designed and constructed in accordance with this invention, thus finds universal application to almost any type or kind of staple operation.

While certain novel features of this invention have been disclosed herein and are pointed out in the claims, it will be understood that various omissions, substitutions, and changes may be made by those skilled in the art without departing from the spirit of the invention.

What is claimed is:

1. Stapling apparatus including, a rotatably mounted drive shaft, a stapling arm mounted on and supported by said shaft and extending laterally therefrom, said stapling arm including a staple former, a staple driver, a staple shaping anvil element, and a staple clinching block, and means operably connecting said staple former and staple driver to said shaft whereby said staple former and staple driver are reciprocated when said drive shaft is rotated, said connecting means including a cam member fixed to said shaft and presenting a continuous camming edge, a cam roller connected to said staple driver and designed to roll over said camming edge, resilient means for retaining said cam roller in rolling contact with said camming edge, and a crank arm connecting said shaft to said staple former, and means driven by said shaft for swingably oscillating said stapling arm about said drive shaft as a pivot, said means being operative to swing the stapling end of the stapling arm forwardly during the staple forming and driving operation and to swing the stapling end of said stapling arm rearwardly to effect insertion of a staple length section of wire into the staple forming end of said stapling arm.

2. Stapling apparatus including, a rotatably mounted drive shaft, a stapling arm including a casing mounted on and supported by said shaft and extending laterally therefrom, a staple former slidably supported by said casing, a staple driver slidably supported by said casing, a staple shaping anvil element slidably mounted in said casing, a staple clinching block mounted on the end of said casing, and means operably connecting said staple former and staple driver to said shaft whereby said staple former and staple driver are reciprocated when said drive shaft is rotated, said connecting means including a cam member fixed to said shaft and presenting a continuous camming edge, a cam roller connected to said staple driver and designed to roll over said camming edge, a connecting rod having one end thereof connected to said cam member in off-center relationship to the axis of said shaft and the other end thereof connected to said staple former, and means driven by said shaft for swingably oscillating said stapling arm about said drive shaft as a pivot, said means being operative to swing the stapling end of the stapling arm forwardly during the staple forming and driving operation and to swing the stapling end of said stapling arm rearwardly to effect insertion of a staple length section of wire into the staple forming end of said stapling arm.

3. Stapling apparatus including, a rotatably mounted drive shaft, a stapling arm including a casing extending laterally from and supported by said drive shaft, a staple former slidably supported by said casing and presenting a pair of spaced leg extensions having staple forming grooves extending longitudinally along the inner spaced surfaces thereof, a staple driver supported by said casing and having a driving bar slidable between said leg extensions, a staple shaping anvil element slidably mounted in said casing structure and having a wire receiving groove in the end thereof, resilient means for projecting the staple forming end of said anvil element between the leg extensions of said staple former, and means operably connecting said staple former and staple driver to said shaft whereby said staple former and staple driver are reciprocated when said drive shaft is rotated, said connecting means including a cam member fixed to said shaft and presenting a continuous camming edge, a cam roller connected to said staple driver and designed to roll over said camming edge, resilient means for retaining said cam roller in rolling contact with said camming edge, and a connecting rod having one end thereof connected to said cam member in off-center relationship to the axis of said shaft and the other end thereof connected to said staple former and means driven by said shaft for swingably oscillating said stapling arm about said drive shaft as a pivot, said means being operative to swing the stapling end of the stapling arm forwardly during the staple forming and driving operation and to swing the stapling end of said stapling arm rearwardly to effect insertion of a staple length section of wire into the staple forming end of said stapling arm.

4. Stapling apparatus including, a rotatably mounted drive shaft, a stapling arm including a casing extending laterally from and supported by said drive shaft, a staple former slidably supported by said casing and presenting a pair of spaced leg extensions having staple forming grooves extending longitudinally along the inner spaced surfaces thereof, a staple driver supported by said casing and having a driving bar slidable between said leg extensions, a staple shaping anvil element slidably mounted in said casing and having a wire receiving groove in the end thereof, resilient means for projecting the staple forming end of said anvil element between said leg extensions of the staple former, cooperating wire shearing elements supported by said casing and staple former, a staple clinching block mounted on the end of said casing, and means operably connecting said staple former and staple driver to said shaft whereby said staple former and staple driver are reciprocated when said drive shaft is rotated, said connecting means including a cam member fixed to said shaft and presenting a continuous camming edge, a cam roller connected to said staple driver and designed to roll over said camming edge, resilient means for retaining said cam roller in rolling contact with said camming edge, and a connecting rod having one end thereof connected to said cam member in off-center relationship to the axis of said shaft and the other end thereof connected to said staple former, and means driven by said shaft for swingably oscillating said stapling arm about said drive shaft as a pivot, said means being operative to swing the stapling end of the stapling arm forwardly during the staple forming and driving operation and to swing the stapling end of said stapling arm rearwardly to effect insertion of a staple length section of wire into the staple forming end of said stapling arm.

5. Stapling apparatus including, a stapling arm casing formed by a pair of spaced guide walls, a thin connecting plate having an unobstructed outer face, and an end block spaced from the inside face of said connecting plate, a staple former slidably supported by said casing and presenting a pair of spaced leg extensions having aligned staple forming grooves in the ends thereof and staple forming groove extensions along the inner surfaces thereof, said groove extensions being directly adjacent the inside face of said connecting plate, a staple driver supported by said casing and having a driving bar slidable between said leg extensions, said driver bar having a staple driving edge in the plane of said groove extensions and a tapered cam surface extending from said driving edge, an anvil pin slidably transversely in a conforming hole formed in the end block of said casing and preventing a staple forming end portion designed to extend between the leg extensions of said staple former, said anvil pin having a tapered end face designed to cam against the tapered face of said driver bar and a wire receiving groove extending transversely across the end face thereof and parallel to the aligned wire grooves formed in the leg extensions of said staple former, resilient means for urging the tapered end face of said anvil pin into camming engagement with the tapered cam face of said driver bar, and means for reciprocating said staple former and staple driver.

6. Stapling apparatus including a stapling arm casing formed by a pair of spaced guide walls, a thin connecting plate having an unobstructed outer face, and an end block spaced from the inside face of said connecting plate, a staple former slidably supported by said casing and presenting a pair of spaced leg extensions having aligned staple forming grooves in the ends thereof and staple forming groove extensions along the inner surfaces thereof, said groove extensions being directly adjacent the inside face of said connecting plate, a staple driver supported by said casing and having a driver bar slidable between said leg extensions and presenting a staple driving edge in the plane of said groove extensions, a shearing block extending transversely into said casing structure and presenting a wire receiving hole extending in the plane of the aligned grooves formed in the ends of the leg extensions of said staple former, a shearing blade fixed to the end of one of said leg extensions and designed to shear against the adjacent end of said shearing block, and means for reciprocating said staple former and staple driver.

7. Stapling apparatus including, a stapling arm casing formed by a pair of spaced guide walls, a thin connecting plate having an unobstructed outer face, and an end block spaced from the inside face of said connecting plate, a staple former slidably supported by said casing and presenting a pair of spaced leg extensions having aligned staple forming grooves in the ends thereof and staple forming groove extensions along the inner surfaces thereof, said groove extensions being directly adjacent the inside face of said connecting plate, a staple driver supported by said casing and having a driver bar slidable between said leg extensions, said driver bar having a staple driving edge in the plane of said grove extensions, an anvil pin slidably transversely in a conforming hole formed in the end block of said casing and presenting a wire receiving opening extending in the plane of the aligned grooves formed in the ends of the leg extensions of said staple former, a shearing blade fixed to the end of one of said leg extensions and designed to shear against the adpacent end of said shearing block, and means for reciprocating said staple former and staple driver.

8. Stapling apparatus including a stapling arm casing formed by a pair of spaced guide walls, a thin connecting plate having an unobstructed outer face, and an end block spaced from the inside face of said connecting plate, a staple former slidably supported by said casing and presenting a pair of spaced leg extensions having aligned staple forming grooves in the ends thereof and staple forming groove extensions along the inner surfaces thereof, said groove extensions being directly adjacent the inside face of said connecting plate, a staple driver supported by said casing and having a driver bar slidable between said leg extensions, said driver bar having a staple driving edge in the plane of said grove extensions and a tapered cam surface extending from said driving edge, an anvil pin slidably transversely in a conforming hole formed in the end block of said casing and presenting a staple forming end portion designed to extend between the leg extensions of said staple former, said anvil pin having a tapered end face designed to cam against the tapered face of said driver bar and a wire receiving grove extending transversely across the end face thereof and parallel to the aligned wire grooves formed in the leg extensions of said staple former, resilient means for urging the tapered end face of said anvil pin into camming engagement with the tapered cam face of said driver bar, a shearing block extending transversely into said casing structure and presenting a wire receiving opening extending in the plane of the aligned grooves formed in the ends of the leg extensions of said staple former, a shearing blade fixed to the end of one of said leg extensions and designed to shear against the adjacent end of said shearing block, and means for reciprocating said staple former and staple driver.

9. Stapling apparatus including, a rotatably mounted drive shaft, a stapling arm extending laterally from said drive shaft and swingably supported thereon, means for swingably oscillating said stapling arm about said drive shaft as a pivot, said stapling arm including means for cutting, forming and driving a staple during the advance swing of said stapling arm, and means fixed to said stapling arm for gripping and advancing a sectional length of stapling wire during the advance swing of the stapling arm to thereby place a following staple length section of wire in position for cutting upon completion of the return swing of said stapling arm.

10. Stapling apparatus including, a rotatably mounted drive shaft, a stapling arm swingably mounted on and supported by said shaft and projecting laterally therefrom, said stapling arm including a staple former, a staple driver, a staple shaping element, and cooperating wire shearing elements, means operably connecting said staple former and staple driver to said drive shaft whereby said staple former and staple driver are reciprocated when said drive shaft is rotated, and means for swingably oscillating said stapling arm about said drive shaft as a pivot in synchronism with the reciprocating movement of said staple former and staple driver whereby a staple length section of wire is cut, the wire section shaped to staple form, and the formed staple driven during the advance swing of said stapling arm, and means fixed to said stapling arm for gripping and advancing a sectional length of stapling wire during the advance swing of the stapling arm to thereby place a following staple length section of wire in position for cutting upon completion of swing of said stapling arm.

11. Stapling apparatus including, a rotatably mounted drive shaft, a stapling arm including a casing swingably mounted on and supported by said shaft and projecting laterally therefrom, a staple former slidably supported by said casing, a staple driver supported by said casing, a staple shaping element slidable transversely in said casing, and cooperating wire shearing elements supported by said casing and staple former, means operably connecting said staple former and staple driver to said drive shaft whereby said staple former and staple driver are reciprocated when said drive shaft is rotated, and means for swingably oscillating said stapling arm about said drive shaft as a pivot arm in synchronism with the reciprocating movement of said staple former and staple driver whereby a staple length section of wire is cut, the wire section shaped to staple form, and the formed staple driven during the advance swing of said stapling arm, and means fixed to said stapling arm for gripping and advancing a sectional length of stapling wire during the advance swing of the stapling arm to thereby place a following staple length section of wire in position for cutting upon completion of swing of said stapling arm.

12. Stapling spparatus including, a rotatably mounted drive shaft, a stapling arm swingably mounted on and supported by said shaft and extending laterally therefrom, said stapling arm including a staple former, a staple driver, a staple shaping anvil element, cooperating wire shearing elements, and a staple clinching block mounted on the end of said stapling arm, means operably connected to said drive shaft for reciprocating said staple former and staple driver, means for swingably oscillating said stapling arm about said drive shaft as a pivot in synchronism with the reciprocating movement of said staple driver and staple former whereby a staple length section of wire is out, a staple formed therefrom, and the formed staple driven during the advance swing of said stapling arm, and means fixed to said stapling arm for gripping and advancing a sectional length of stapling wire during the advance swing of the stapling arm to thereby place a following staple length section of wire in position for cutting upon completion of the return swing of said stapling arm.

13. Stapling apparatus including, a rotatably mounted drive shaft, a stapling arm including a casing structure swingably mounted on and supported by said shaft and extending laterally therefrom, a staple former slidably supported in said casing structure, a staple driver slidably supported in said casing structure, staple shaping anvil element slidably mounted in said casing structure, a wire receiving groove at the end of said anvil element, cooperating wire shearing elements associated with said casing structure and said staple former, a staple clinching block mounted on the end of said casing structure, means operably connected to said drive shaft for reciprocating said staple former and staple driver, means operably connected to said drive shaft for swingably oscillating said stapling arm about said drive shaft as a pivot in synchronism with the reciprocating movement of said staple driver and staple former whereby a staple length section of wire is cut, a staple formed therefrom, and the formed staple driven during the advance swing of said stapling arm, and means fixed to said stapling arm for gripping and advancing a sectional length of stapling wire during the advance swing of the stapling arm to thereby place a following staple length section of wire in position for cutting upon completion of the return swing of said stapling arm.

14. Stapling apparatus including, a rotatably mounted drive shaft, a stapling arm including a casing structure swingably mounted on and supported by said shaft and extending laterally therefrom, a staple former slidably supported in said casing structure and presenting a pair of spaced leg extensions having staple forming grooves extending longitudinally along the inner surfaces thereof, a staple driver presenting a driving bar slidably supported in said casing structure between said staple forming leg extensions, a staple shaping anvil element slidably mounted in said casing structure and having an end portion designed to project between the leg extensions of the staple former, a wire receiving groove at the end of said anvil element, cooperating wire shearing elements associated with said casing structure and one of the leg extensions of said staple former, a staple clinching block mounted on the end of said casing structure, means operably connected to said drive shaft for reciprocating said staple former and staple driver, means operably connected to said drive shaft for swingably oscillating said stapling arm about said drive shaft as a pivot in synchronism with the reciprocating movement of said staple driver and staple former whereby a staple length section of wire is cut, a staple formed therefrom, and the formed staple driven during the advance swing of said stapling arm, and means fixed to said stapling arm for gripping and advancing a sectional length of stapling wire during the advance swing of the stapling arm to thereby place a following staple length section of wire in position for cutting upon completion of the return swing of said stapling arm.

15. Apparatus for driving staples closely adjacent the line of bend defined between overlapped workpiece elements to be stapled and a connected workpiece element flaring laterally from the overlapped elements, said apparatus including, a stapling arm casing presenting a thin wall plate having an outer face designed to be positioned closely adjacent the laterally flared element of the workpiece, and spaced side walls extending from said thin wall plate, a staple former presenting a pair of spaced leg extensions slidable along the inner face of said thin wall plate, staple forming grooves extending longitudinally along the inner surfaces of said leg extensions and directly adjacent the inner face of said thin wall plate whereby a wall portion of each groove is formed by the inner face of said plate, a staple driver having a driving bar slidable along the inner surface of said thin wall plate between said leg extensions and presenting a staple driving edge adjacent said thin wall plate, and means for reciprocating said staple former and staple driver.

16. Apparatus for driving staples closely adjacent the line of bend defined between overlapped workpiece elements to be stapled and a connected workpiece element flaring laterally from the overlapped elements, said apparatus including, a stapling arm casing presenting a thin wall plate having an outer face designed to be positioned closely adjacent the laterally flared element of the workpiece and spaced side walls extending from said thin wall plate, a staple former presenting a pair of spaced leg extensions slidable along the inner face of said thin wall plate, staple forming grooves extending longitudinally along the inner surfaces of said leg extensions and directly adjacent the inner face of said thin wall plate whereby a wall portion of each groove is formed by the inner face of said plate, a staple driver having a driving bar slidable along the inner surface of said thin wall plate between said leg extensions and presenting a staple driving edge adjacent said thin wall plate, a staple shaping anvil element having a staple shaping end portion provided with a wire-receiving groove in the end thereof, resilient means for projecting the staple shaping end portion of the anvil element between said leg extensions, and means for reciprocating said staple former and staple driver.

17. Apparatus for driving staples closely adjacent the line of bend defined between overlapped workpiece elements to be stapled and a connected workpiece element flaring laterally from the overlapped elements, said apparatus including a stapling arm casing presenting a thin wall plate having an outer face designed to be positioned closely adjacent the laterally flared element of the workpiece and spaced side walls extending from said wall plate, a staple former presenting a pair of spaced leg extensions slidable along the inner face of said wall plate, staple forming grooves extending longitudinally along the inner surfaces of said leg extensions and directly adjacent the inner face of said wall plate whereby a wall portion of each groove is formed by the inner face of said plate, a staple driver having a driving bar slidable along the inner surface of said wall plate between said leg extensions and presenting a staple driving edge adjacent said wall plate, a clinch block spaced from the end of said thin wall plate and supported from the guide walls of said casing, and means for reciprocating said staple former and staple driver.

18. Apparatus for driving staples closely adjacent the line of bend defined between overlapped workpiece elements to be stapled and a connected workpiece element flaring laterally at substantially a right angle from the overlapped elements, said apparatus including a stapling arm casing presenting a thin wall plate having a smooth outer face designed to be positioned closely adjacent the laterally flared element of the workpiece and spaced guide walls extending from said thin wall plate, a staple former presenting a pair of spaced leg extensions slidable along the inner face of said thin wall plate, aligned wire receiving grooves extending transversely across the ends of said leg extensions and groove extensions extending longitudinally along the inner surfaces of said leg extensions and directly adjacent the inner face of said thin wall plate whereby a wall portion of each groove is formed by the inner face of said plate, a staple driver having a driving bar slidable along the inner surface of said thin wall plate between said leg extensions and presenting a staple driving edge adjacent said thin wall plate, a staple shaping anvil element having a staple shaping end portion provided with a wire-receiving groove in the end thereof, resilient means for projecting the staple shaping end portion of the anvil element between said leg extensions with the transverse groove in the end thereof in the plane of the groove extensions formed in said leg extensions, a clinching block spaced from the end of said thin wall plate and supported from the guide walls of said casing, and means for reciprocating said staple former and staple driver.

19. Apparatus for applying staples to continuously advacing workpieces including, a workpiece supporting conveyor, means for driving said conveyor at continuous speed, stapling mechanism associated with the conveyor including a rotatably mounted drive shaft positioned at one side edge of said conveyor, means for rotating said shaft in synchronism with the travel speed of said conveyor, a stapling arm swingably mounted on said shaft and extending laterally from said shaft and transversely of the workpiece supporting conveyor, said stapling arm including a staple former and a staple driver having the staple forming and driving ends thereof positioned adjacent the line of travel of the workpiece elements to be stapled as advanced by said conveyor means operatively connecting said staple former and staple driver to said shaft whereby said staple former and staple driver are reciprocated transversely of the workpiece supporting conveyor during rotation of said shaft, and means driven by said shaft for swingably oscillating said stapling arm about said drive shaft as a pivot, said means being operative to swing the stapling end of said stapling arm forwardly at the speed of advance travel of the workpiece elements on said conveyor during the staple forming and driving operation, and to swing the stapling end of said stapling arm rearwardly to thereby effect insertion of a staple length section of wire into the staple forming end of said stapling arm.

20. Apparatus for applying staples to continuously advancing workpieces including, a workpiece supporting conveyor, means for driving said conveyor at continuous speed, stapling mechanism associated with the conveyor including a rotatably mounted drive shaft positioned at one edge of said conveyor, means for rotating said shaft in synchronism with the travel speed of said conveyor, a stapling arm swingably mounted on said shaft and extending laterally from said shaft and transversely of the workpiece supporting conveyor, said stapling arm including a staple former and a staple driver having the staple forming and driving ends thereof positioned adjacent the line of travel of the workpiece elements to be stapled as advanced by said conveyor, means for supplying stapling wire to said stapling arm, means operatively connecting said staple former and staple driver to said shaft whereby said staple former and staple driver are reciprocated transversely of the workpiece supporting conveyor during rotation of said shaft, and means driven by said shaft for swingably oscillating said stapling arm about said drive shaft as a pivot, said means being operative to swing the stapling end of said stapling arm forwardly at the speed of advance travel of the workpiece elements on said conveyor during the staple forming and driving operation and to swing the stapling end of said stapling arm rearwardly to thereby effect insertion of a staple length section of wire into the staple forming end of said stapling arm.

21. Apparatus for applying staples to continuously advancing workpieces including, a workpiece supporting conveyor, means for driving said conveyor at predetermined uniform speed, stapling mechanism associated with the conveyor including a rotatably mounted drive shaft, positioned at one side edge of said conveyor, means for rotating said shaft in synchronism with the travel speed of said conveyor, a stapling arm casing swingably mounted on said shaft and extending laterally from said shaft and transversely of the workpiece supporting conveyer, a staple former and a staple driver reciprocably mounted on said casing and having the staple forming and driving ends thereof positioned adjacent the line of travel of the workpiece elements to be stapled as advanced by said conveyor, a staple clinching block supported by and projecting from the end of said casing, means operatively connecting said staple former and staple driver to said shaft whereby said staple former and staple driver are reciprocated transversely of the workpiece supporting conveyor during rotation of said shaft, and means driven by said shaft for swingably oscillating said stapling arm about said drive shaft as a pivot, said means being operative to swing the stapling end of said stapling arm forwardly at the speed of advance travel of the workpiece elements on said conveyor during the staple forming and driving operation and to swing the stapling end of said stapling arm rearwardly to thereby effect insertion of a staple length section of wire into the staple forming end of said stapling arm.

22. Apparatus for applying staples to continuously advancing workpieces including, a workpiece supporting conveyor, means for driving said conveyor at perdetermined uniform speed, stapling mechanism associated with the conveyor including a rotatably mounted drive shaft positioned at one side edge of said conveyer, means for rotating said shaft in synchronism with the travel speed of said conveyer, a stapling arm including a casing swingably mounted on said shaft and extending laterally from said shaft and transversely of the workpiece supporting conveyer, a staple former and a staple driver reciprocably mounted on said casing and having the staple forming and driving ends thereof positioned adjacent the line of travel of the workpiece elements to be stapled as advanced by said conveyor, a staple forming anvil element mounted in said casing, cooperating wire shearing element supported by said casing and staple former, a staple clinching block supported by and projected from the end of said casing, means for supplying stapling wire to said stapling arm, means operatively connecting said staple former and staple driver are reciprocated transversely of the workpiece supporting conveyer during rotation of said shaft, and means driven by said shaft for swingably oscillating said stapling arm about said drive shaft as a pivot, said means being operative to swing the stapling end of said stapling arm forwardly at the speed of advance travel of the workpiece elements on said conveyor during the staple cutting, the staple forming, and the staple driving operation and to swing the stapling end of said stapling arm rearwardly to thereby effect insertion of a staple length section of wire into the staple forming end of said stapling arm.

23. Apparatus for applying staples to continuously advancing workpieces including, a workpiece supporting conveyor, means for driving said conveyor at continuous speed, stapling mechanism associated with the conveyor including a rotatably mounted drive shaft positioned at one side edge of said conveyer, means for rotating said shaft in synchronism with the travel speed of said conveyer, a stapling arm including a casing swingably mounted on said shaft and extending laterally from said shaft and transversely of the workpiece supporting conveyer therefrom, a staple former slidably supported by said casing, a staple driver slidably supported by said casing, cooperating wire shearing elements associated with said casing and said staple former, and a staple clinching block mounted on the end of said casing, means operably connecting said staple former and staple driver to said drive shaft whereby said staple former and staple driver are reciprocated transversely of the workpiece supporting conveyer during rotation of said shaft, means operably connected to said drive shaft for swingably oscillating said stapling arm about said drive shaft as a pivot and in synchronism with the reciprocating movement of said staple former and staple driver, whereby said stapling arm is swung forwardly at the speed of advance travel of the workpiece elements on said conveyor during the staple cutting, the staple forming and the staple driving operation and said stapling arm is swung rearwardly during insertion of a staple length section of wire into the staple forming end of said stapling arm, and means for advancing a following staple length section of wire during the advance swing of said stapling arm whereby said following length section of wire is placed in position for cutting upon completion of the return swing of said stapling arm.

24. Apparatus for applying staples to continuously advancing workpieces including, a workpiece supporting conveyor, means for driving said conveyor at continuous speed, stapling mechanism associated with the conveyor including a rotatably mounted drive shaft positioned at one side edge of said conveyer, means for rotating said shaft in synchronism with the travel speed of said conveyer, a stapling arm including a casing swingably mounted on said shaft and extending laterally from said shaft and transversely of the workpiece supporting conveyer, a staple former slidably supported by said casing, a staple driver supported by said casing, a staple shaping anvil element slidably mounted in said casing, cooperating wire shearing elements associated with said casing and said staple former, and a staple clinching block mounted on the end of said casing, means operably connecting said staple former and staple driver to said drive shaft whereby said staple former and staple driver are reciprocated transversely of the workpiece supporting conveyer during rotation of said shaft, means operably connected to said drive shaft for swingably oscillating said stapling arm about said drive shaft as a pivot and in synchronism with the reciprocating movement of said staple former and staple driver, whereby said stapling arm is swung forwardly at the speed of advance travel of the workpiece elements on said conveyor during the staple cutting, the staple forming and the staple driving operation and said stapling arm is swung rearwardly during insertion of a staple length section of wire into the staple forming end of said stapling arm, and means for advancing a following staple length section of wire during the advance swing of said stapling arm whereby said following length section of wire is placed in position for cutting upon completion of the return swing of said stapling arm.

25. Apparatus for applying staples to continuously advancing workpieces including, a workpiece supporting conveyor, means for driving said conveyor at uniform speed, stapling mechanism associated with the conveyor including a rotatably mounted drive shaft positioned at one side edge of said conveyer, means for rotating said shaft in synchronism with the travel speed of said conveyer, a stapling arm including a casing swingably mounted on said shaft and extending laterally from said shaft and transversely of the workpiece supporting conveyer, a staple former slidably supported by said casing and presenting a pair of spaced leg extensions, a staple driver presenting a driving bar slidably supported by said casing and extending between said staple forming leg extensions, a staple shaping anvil element slidably mounted in said casing and having an end portion designed to project between the leg extensions of the staple former, cooperating wire shearing elements associated with said casing and one of the leg extensions of said staple former, and a staple clinching block mounted on the end of said casing, means operably connecting said staple former and staple driver to said drive shaft whereby said staple former and staple driver are reciprocated transversely of the workpiece supporting conveyer during rotation of said shaft, means operably connected to said drive shaft for swingably oscillating said stapling arm about said drive shaft as a pivot and in synchronism with the reciprocating movement of said staple former and staple driver, whereby said stapling arm is swung forwardly at the speed of advance travel of the workpiece elements on said conveyor during the staple cutting, the staple forming and the staple driving operation and said stapling arm is swung rearwardly during insertion of a staple length section of wire into the staple forming end of said stapling arm, and means for advancing a following staple length section of wire during the advance swing of said stapling arm whereby said following length section of wire is placed in position for cutting upon completion of the return swing of said stapling arm.

26. Apparatus for applying staples to continuously advancing workpieces including, a workpiece supporting conveyor, means for driving said conveyor at uniform speed, stapling mechanism associated with the conveyor including a rotatably mounted drive shaft positioned at one side edge of said conveyer, means for rotating said shaft in synchronism with the travel speed of said conveyer, a stapling arm including a casing swingably mounted on said shaft and extending laterally from said shaft and transversely of the workpiece supporting conveyer, a staple former slidably supported by said casing and presenting a pair of spaced leg extensions having staple forming grooves extending longitudinally along the inner surfaces thereof, a staple driver presenting a driving bar slidably supported by said casing and extending between said staple forming leg extensions, a staple shaping anvil element slidably mounted in said casing and having an end portion designed to project between the leg extensions of the staple former, a wire receiving groove at the end of said anvil element, cooperating wire shearing elements associated with said casing and one of the leg extensions of said staple former, and a staple clinching block mounted on the end of said casing, means operably connecting said staple former and staple driver to said driver shaft whereby said staple former and staple driver are reciprocated transversely of the workpiece supporting conveyer during rotation of said shaft, means operably connected to said drive shaft for swingably oscillating said stapling arm about said drive shaft as a pivot and in synchronism with the reciprocating movement of said staple former and staple driver whereby said stapling arm is swung forwardly at the speed of advance travel of the workpiece elements on said conveyor during the staple cutting, the staple forming and the staple driving operation and said stapling arm is swung rearwardly during insertion of a staple length section of wire into the staple forming end of said stapling arm, and means for advancing a following staple length section of wire during the advance swing of said stapling arm whereby said following length section of wire is placed in position for cutting upon completion of the return swing of said stapling arm.

27. Apparatus for applying staples to continuously advancing workpieces including, a workpiece supporting conveyor, means for driving said conveyor at continuous speed, stapling mechanism associated with the conveyor including a rotatably mounted drive shaft positioned at one side edge of said conveyer, means for rotating said shaft in synchronism with the travel speed of said conveyor, a stapling arm including a staple former, a staple driver, and cooperating wire shearing elements, means operably connecting said staple former and staple driver to said drive shaft whereby said staple former and staple driver are reciprocated during rotation of said shaft transversely of the workpiece supporting conveyor, means operably connected to said drive shaft for oscillating said stapling arm in synchronism with the reciprocating movement of said staple former and staple driver whereby said stapling arm is swung forwardly at the speed of advance travel of the workpiece element on said conveyor during the staple cutting, the staple forming and the staple driving operation and said stapling arm is swung rearwardly during insertion of a staple length section of wire into the staple forming end of said stapling arm, said oscillating means including a cam member having a cam track, means operatively connecting said cam member to said drive shaft to rotate said cam member in speed relation to the rotation of said drive shaft, a lever pivotally connected to said stapling arm, a cam roller rotatably mounted on said lever and positioned to roll in the cam track of said cam member, and means swingably connecting said lever to a fixed support.

28. Apparatus for applying staples to continuously advancing workpieces including, a workpiece supporting conveyor, means for driving said conveyor at continuous speed, stapling mechanism associated with the conveyor including a rotatably mounted drive shaft positioned at one side edge of said conveyer, means for rotating said shaft in synchronism with the travel speed of said conveyor, a stapling arm including a staple former, a staple driver, a staple shaping anvil element, cooperating wire shearing connecting said staple former and staple driver to said drive shaft whereby said staple former and staple driver are reciprocated during rotation of said shaft transversely of the workpiece supporting conveyer, means operably connected to said drive shaft for oscillating said stapling arm in synchronism with the reciprocating movement of said staple former and staple driver whereby said stapling arm is swung forwardly at the speed of advance travel of the workpiece element on said conveyor during the staple cutting, the staple forming and the staple driving operation and said stapling arm is swung rearwardly during insertion of a staple length section of wire into the staple forming end of said stapling arm, said oscillating means including a cam member having a cam track, means operatively connecting said cam member to said drive shaft to rotate said cam member in speed relation to the rotation of said drive shaft, a bell crank lever having the heel thereof pivotally connected to said stapling arm, a cam roller rotatably mounted on one arm of said bell crank lever and positioned to roll in the cam track of said cam member, and a link element swingably connecting the other arm of said bell crank lever to a fixed support.

29. Apparatus for applying staples to continuously advancing workpieces including, a workpiece supporting conveyor, means for driving said conveyor at continuous speed, stapling mechanism associated with the conveyor including a rotatably mounted drive shaft positioned at one side edge of said conveyer, means for rotating said drive shaft in synchronism with the travel speed of said conveyor, a stapling arm including a casing swingably mounted on said shaft and extending laterally from said shaft and transversely of the workpiece supporting conveyer, a staple former slidably supported by said casing, a staple driver slidably supported by said casing, a staple shaping anvil element slidably mounted in said casing, cooperating wire shearing elements associated with said casing and said staple former, and a staple clinching block mounted on the end of said casing, means operably connecting said staple former and staple driver to said drive shaft whereby said staple former and staple driver are reciprocated transversely of the workpiece supporting conveyer during rotation of said shaft, means operably connected to said drive shaft for oscillating said stapling arm in sychronism with the reciprocating movement of said staple former and staple driver whereby said stapling arm is swung forwardly at the speed of advance travel of the workpiece element on said conveyor during the staple cutting, the staple forming and the staple driving operation and said stapling arm is swung rearwardly during insertion of a staple length section of wire into the staple forming end of said stapling arm, said oscillating means including a cam member having a cam track, means operatively connecting said cam member to said drive shaft to rotate said cam member in speed relation to the rotation of said drive shaft, a bell crank lever having the heel thereof pivotally connected to said stapling arm casing, a cam roller rotatably mounted on one arm of said bell crank lever and positioned to roll in the cam track of said cam member, and a link element swingably connecting the other arm of said bell crank lever to a fixed support.

30. Apparatus for applying staples to continuously advancing workpieces including, a workpiece supporting conveyor, means for driving said conveyor at continuous speed, stapling mechanism associated with the conveyor including a rotatably mounted drive shaft, means for rotating said drive shaft in synchronism with the travel speed of said conveyor, a stapling arm including a casing swingably mounted on said shaft and extending laterally therefrom, a staple former slidably supported by said casing, a staple driver slidably supported by said casing, a staple shaping anvil element slidably mounted in said casing, cooperating wire shearing elements associated with said casing and said staple former, and a staple clinching block mounted on the end of said casing, means operably connecting said staple former and staple driver to said drive shaft whereby said staple former and staple driver are reciprocated during rotation of said shaft, said connecting means including a cam member fixed to said shaft and presenting a continuous camming edge, a cam roller connected to said staple driver and designed to roll over said camming edge, resilient means for retaining said cam roller in rolling contact with said camming edge, and a connecting rod having one end thereof connected to said cam member and the other end thereof connected to said staple former, means operably connected to said drive shaft for oscillating said stapling arm in synchronism with the reciprocating movement of said staple former and staple driver whereby said stapling arm is swung forwardly at the speed of advance travel of the workpiece element on said conveyor during the staple cutting, the staple forming and the staple driving operation and said stapling arm is swung rearwardly during insertion of a staple length section of wire into the staple forming end of said stapling arm, said oscillating means including a cam member having a cam track, means operatively connecting said cam member to said drive shaft to rotate said cam member in speed relation to the rotation of said drive shaft, a bell crank lever having the heel thereof pivotally connected to said stapling arm casing, a cam roller rotatably mounted on one arm of said bell crank lever and positioned to roll in the cam track of said cam member, and a link element swingably connecting the other arm of said bell crank lever to a fixed support.

31. Apparatus for applying staples to continuously advancing workpieces including, a stapling arm which includes a staple former, a staple driver, a staple shaping anvil, a shearing block having a wire receiving hole and a wire shearing blade fixed to said staple former, means for reciprocating said staple former and staple driver, means for guiding a stapling wire into the wire receiving hole of said shearing block, means for swingably oscillating said stapling arm about a fixed pivot point so that the staple forming end thereof swings in a direction substantially parallel to the direction of advance of the workpiece and so that the length of the advance and return swings of the staple forming end of said stapling arm are substantially equal to the length of the wire section required to form the desired staple, wire gripping means attached to said stapling arm operative to grip the wire and maintain the wire in the hole of said shearing block during the advance swing of said stapling arm and to release the wire during the return swing of the stapling arm, and means for preventing return movement of the stapling wire during the return swing of said stapling arm.

32. Apparatus for applying staples to continuously advancing workpieces including, a stapling arm which includes a swingably mounted casing, a staple former and a staple driver slidably supported by said casing, a staple shaping anvil slidably mounted in said casing, a shearing block having a wire receiving hole mounted in said casing, a wire shearing blade fixed to said staple former, and a staple clinching block mounted on the end of said casing, means for reciprocating said staple former and staple driver, means for guiding a stapling wire into the wire receiving hole of said shearing block, means for swingably oscillating said stapling arm about a fixed pivot point so that the staple forming end thereof swings in a direction substantially parallel to the direction of advance of the workpiece and so that the length of the advance and return swings of the staple forming end of said stapling arm are substantially equal to the length of the wire section required to form the desired staple, wire gripping means attached to said stapling arm casing operative to grip the wire and maintain the wire in the hole of said shearing block during the advance swing of said stapling arm and to release the wire during the return swing of the stapling arm, and means for preventing return movement of the stapling wire during the return swing of said stapling arm.

33. Apparatus for applying staples to continuously advancing workpieces including, a stapling arm which includes a staple former, a staple driver, a staple shaping anvil, a shearing block having a wire receiving hole and a wire shearing blade fixed to said staple former, means for reciprocating said staple former and staple driver, means for guiding a stapling wire into the wire receiving hole of said shearing block, means for swingably oscillating said stapling arm about a fixed pivot point so that the staple forming end thereof swings in a direction substantially parallel to the direction of advance of the workpiece, wire gripping means attached to said stapling arm operative to grip the wire and maintain the wire in the hole of said shearing block during the advance swing of said stapling arm and to release the wire during the return swing of the stapling arm, means for preventing return movement of the stapling wire during the return swing of said stapling arm, said stapling arm oscillating means being driven in synchronism with the reciprocating movement of said staple former and staple driver whereby said stapling arm is swung forwardly during the staple cutting, the staple forming and the staple driving operation and the stapling arm is moved into staple cutting position with respect to the following staple length section of wire during the return swing of said stapling arm.

34. Apparatus for applying staples to continuously advancing workpieces including, a stapling arm which includes a staple former, a staple driver, a staple shaping anvil, a shearing block having a wire receiving hole and a wire shearing blade fixed to said staple former, means for reciprocating said staple former and staple driver, means for guiding a stapling wire into the wire receiving hole of said shearing block, means for swingably oscillating said stapling arm about a fixed pivot point so that the staple forming end thereof swings in a direction substantially parallel to the direction of advance of the workpiece and so that the length of the advance and return swings of the staple forming end of said stapling arm are substantially equal to the length of the wire section required to form the desired staple, wire gripping means attached to said stapling arm operative to grip the wire and maintain the wire in the hole of said shearing block during the advance swing of said stapling arm and to release the wire during the return swing of the stapling arm, means for preventing return movement of the stapling wire during the return swing of said stapling arm, said stapling arm oscillating means being driven in synchronism with the reciprocating movement of said staple former and staple driver whereby said stapling arm is swung forwardly at the speed of advance travel of the workpiece during the staple cutting, the staple forming and the staple driving operation and said stapling arm is moved into staple cutting position with respect to the following staple length section of wire during the return swing of said stapling arm.

35. Apparatus for applying staples to continuously advancing workpieces including, a stapling arm which includes a wingably mounted casing, a staple former and a staple driver slidably supported by said casing, a staple shaping anvil slidably mounted in said casing, a shearing block having a wire receiving hole mounted in said casing, a wire shearing blade fixed to said staple former, and a staple clinching block mounted on the end of said casing, means for reciprocating said staple former and staple driver, means for guiding a stapling wire into the wire receiving hole of said shearing block, means for swingably oscillating said stapling arm about a fixed pivot point so that the staple forming end thereof swings in a direction substantially parallel to the direction of advance of the workpiece and so that the length of the advance and return swings of the staple forming end of said stapling arm are substantially equal to the length of the wire section required to form the desired staple, wire gripping means attached to said stapling arm casing operative to grip the wire and maintain the wire in the hole of said shearing block during the advance swing of said stapling arm and to release the wire during the return swing of the stapling arm, means for preventing return movement of the stapling wire during the return swing of said stapling arm, said stapling arm oscillating means being driven in synchronism with the reciprocating movement of said staple former and staple driver whereby said stapling arm is swung forwardly at the speed of advance travel of the workpiece during the staple cutting, the staple forming and the staple driving operation and the stapling end of said stapling arm is moved into staple cutting position with respect to the following staple length section of wire during the return swing of said stapling arm.

36. Apparatus for applying staples to continuously advancing workpieces including, a stapling arm which includes a staple former, a staple driver, a staple shaping anvil having a wire receiving groove extending transversely across the end thereof, a wire shearing block having a wire receiving hole extending in the plane of the wire groove in said staple shaping anvil, and a wire shearing blade fixed to said staple former and designed to shear against the inner end of said shearing block, a wire supply reel, means for guiding the stapling wire into the wire receiving hole of said shearing block, means for swingably oscillating said stapling arm about a fixed pivot point so that the stapling end thereof swings through successive advance and return swings in a direction substantially parallel to the direction of advance of the workpiece, wire gripping means fixed to said stapling arm operative to withdraw a staple length section of wire from said reel during the advance swing of said stapling arm and to release the wire during the return swing of said stapling arm, means for preventing return movement of the stapling arm, means for preventing return movement of the stapling wire during the return swing of said stapling arm, and means for reciprocating said staple former and staple driver in synchronism with the oscillating movement of said stapling arm.

37. Apparatus for applying staples to continuously advancing workpieces including, a stapling arm which includes a swingably mounted casing, a staple former and a staple driver slidably supported by said casing, a staple shaping anvil slidably mounted on said casing and having a wire receiving groove extending transversely across the end thereof, a wire shearing block mounted in said casing and having a wire receiving hole extending in the plane of the wire groove in said staple shaping anvil, a wire shearing blade fixed to said staple former and operative to shear against the inner end of said shearing block, and a staple clinching block mounted on the end of said casing, a wire supply reel, means for guiding the stapling wire into the wire receiving hole of said shearing block, means for swingably oscillating said stapling arm about a fixed point so that the staple forming end thereof swings through successive advance and return swings in a direction substantially parallel to the direction of advance of the workpiece, wire gripping means fixed to said stapling arm casing operative to withdraw a staple length section of wire from said reel during the advance swing of said stapling arm and to release the wire during the return swing of said stapling arm, means for preventing return movement of the stapling wire during the return swing of said stapling arm, and means for reciprocating said staple former and staple driver in synchronism with the oscillating movement of said stapling arm.

38. Apparatus for applying staples to continuously advancing workpieces including, a stapling arm which includes a staple former, a staple driver, a staple shaping anvil having a wire receiving groove extending transversely across the end thereof, a wire shearing block having a wire receiving hole extending in the plane of the wire groove in said staple shaping anvil, and a wire shearing blade fixed to said staple former and designed to shear against the inner end of said shearing block, a wire supply reel, means for guiding the stapling wire into the wire receiving hole of said shearing block, means for swingably oscillating said stapling arm about a fixed pivot point so that the staple forming end thereof swings through successive advance and return swings in a direction substantially parallel to the direction of advance of the workpiece, wire gripping means fixed to said stapling arm operative to withdraw a staple length section of wire from said reel during the advance swing of said stapling arm and to release the wire during the return swing of said stapling arm, means for preventing return movement of the stapling wire during the return swing of said stapling arm, and means for reciprocating said staple former and staple driver in synchronism with the oscillating movement of said stapling arm whereby a staple length section of wire is cut, a staple formed therefrom and the formed staple driven into the workpiece during the advance swing of said stapling arm, and whereby the groove in said staple forming anvil is telescoped over a following staple length section of wire and said staple cutting blade placed in position for cutting the following staple length section of wire during the return swing movement of said stapling arm.

39. Apparatus for applying staples to continuously advancing workpieces including, a stapling arm which includes, a staple former, a staple driver, a staple shaping anvil having a wire receiving groove extending transversely across the end thereof, a wire shearing block having a wire receiving hole extending in the plane of the wire groove in said staple shaping anvil, a wire shearing blade fixed to said staple shaping anvil, a wire shearing blade fixed to said staple former and designed to shear against the inner end of said shearing block, and a staple clinching block mounted on the end of said stapling arm, a wire supply reel, means for guiding the stapling wire into the wire receiving hole of said shearing block, means for swingably oscillating said stapling arm about a fixed pivot point so that the staple forming end thereof swings in a direction substantially parallel to the direction of advance of the workpiece and through successive advance and return swings whose swing lengths are substantially equal to the length of the wire section required to form the desired staple, wire gripping means fixed to said stapling arm operative to withdraw a staple length section of wire from said reel during the advance swing of said stapling arm and to release the wire during the return swing of said stapling arm, means for preventing return movement of the stapling wire during the return swing of said stapling arm, and means for reciprocating said staple former and staple driver in synchronism with the oscillating movement of said stapling arm whereby a staple length section of wire is cut, a staple formed therefrom and the formed staple driven into the workpiece during the advance swing of said stapling arm, and whereby the groove in said staple forming anvil is telescoped over a following staple length section of wire and said staple cutting blade is placed in position for cutting the following staple length section of wire during the return swing movement of said stapling arm.

40. Apparatus for applying staples to continuously advancing workpieces including, a stapling arm which includes a swingably mounted casing, a staple former and a staple driver slidably supported by said casing, a staple shaping anvil reciprocably supported by said casing and having a wire receiving groove extending transversely across the end thereof, a wire shearing block supported by said casing and having a wire receiving hole extending in the plane of the wire groove in said staple shaping anvil, a wire shearing blade fixed to said staple former and operative to shear against the inner end of said shearing block, and a staple clinching block mounted on the end of said casing, a wire supply reel, cooperating rollers for straightening the wire withdrawn from said reel, means for guiding the stapling wire into the wire receiving hole of said shearing block, means for swingably oscillating said stapling arm about a fixed pivot point so that the staple forming end thereof swings in a direction substantially parallel to the direction of advance of the workpiece and through successive advance and return swings whose swing lengths are substantially equal to the length of the wire section required to form the desired staple, wire gripping means fixed to said stapling arm casing operative to withdraw a staple length section of wire from said reel during the advance swing of said stapling arm and to release the wire during the advance swing of said stapling arm and to release the wire during the return swing of said stapling arm, means for preventing return movement of the stapling wire during the return swing of said stapling arm, and means for reciprocating said staple former and staple driver in synchronism with the oscillating movement of said stapling arm.

41. Apparatus for applying staples to continuously advancing workpieces including, a stapling arm which includes a swingably mounted casing, a staple former and a staple driver slidably supported by said casing, a staple shaping anvil reciprocably supported by said casing and having a wire receiving groove extending transversely across the end thereof, a wire shearing block supported by said casing and having a wire receiving hole extending in the plane of the wire groove in said staple shaping anvil, a wire shearing blade fixed to said staple former and operative to shear against the inner end of said shearing block, and a staple clinching block mounted on the end of said casing, a wire supply reel, cooperating rollers for straightening the wire withdrawn from said reel, means for guiding the stapling wire into the wire receiving hole of said shearing block, means for swingably oscillating said stapling arm about a fixed pivot point so that the staple forming end thereof swings in a direction substantially parallel to the direction of advance of the workpiece and through successive advance and return swings whose swing lengths are substantially equal to the length of the wire section required to form the desired staple, wire gripping means fixed to said stapling arm casing operative to withdraw a staple length section of wire from said reel during the advance swing of said stapling arm and to release the wire during the return swing of said stapling arm, means for preventing return movement of the stapling wire during the return swing of said stapling arm, and means for reciprocating said staple former and staple driver in synchronism with the oscillating movement of said stapling arm whereby a staple length section of wire is cut, a staple formed therefrom and the formed staple driven into the workpiece during the advance swing of said stapling arm, and whereby the groove in said staple forming anvil is telescoped over a following staple length section of wire and said staple cutting blade is placed in position for cutting the following staple length section of wire during the return swing movement of said stapling arm.

42. Apparatus for applying staples to workpieces including, a workpiece conveyor, a conveyor drive member for advancing said conveyor, stapling mechanism associated with said conveyor including a drive shaft, coupling means for detachably connecting said drive shaft to the drive member of said conveyor, a stapling arm including a casing mounted on and wholly supported by said shaft and extending laterally therefrom over the workpiece supporting conveyor, a staple former and a staple driver slidably supported by said casing, means operably connecting said staple former and staple driver to said drive shaft whereby said staple former and staple driver are reciprocated during rotation of said shaft, a bearing assembly rotatably supporting said drive shaft, a fixed supporting bracket and means pivotally connecting said bearing assembly to said bracket whereby said shaft and associated stapling mechanism may be swung away from said conveyor upon detachment of said coupling means from said drive shaft.

43. Apparatus for applying staples to workpieces including, a conveyor framework, a conveyor drive member for advancing said conveyor, stapling mechanism associated with said conveyor including a drive shaft, coupling means for detachably connecting said drive shaft to the drive member of said conveyor, a stapling arm including a casing mounted on and wholly supported by said shaft and extending laterally therefrom over the workpiece supporting conveyor, a staple former and a staple driver slidably supported by said casing, a staple shaping anvil element slidably mounted in said casing, cooperating wire shearing elements associated with said casing and said staple former, and a staple clinching block mounted on the end of said casing, means operably connecting said staple former and staple driver to said drive shaft whereby said staple former and staple driver are reciprocated during rotation of said shaft, a bearing assembly rotatably supporting said drive shaft, a fixed supporting bracket, and means pivotally connecting said bearing assembly to said bracket whereby said shaft and associated stapling mechanism, former and driver reciprocating means and stapling arm oscillating means may be swung away from said conveyor upon detachment of said coupling means from said drive shaft.

44. Apparatus for applying staples to workpieces including, a workpiece conveyor, a conveyor drive member for advancing said conveyor, stapling mechanism associated with said conveyor including a drive shaft, coupling means for detachably connecting said drive shaft to the drive member of said conveyor, a stapling arm including a casing swingably mounted on and wholly supported by said shaft and extending laterally therefrom over the workpiece supporting conveyor, a staple former and a staple driver slidably supported by said casing, means operably connecting said staple former and staple driver to said drive shaft whereby said staple former and staple driver are reciprocated during rotation of said shaft, means operably connected to said drive shaft for oscillating said stapling arm in synchronism with the reciprocating movement of said staple former and staple driver, a bearing assembly rotatably supporting said drive shaft, a fixed supporting bracket, and means pivotally connecting said bearing assembly to said bracket whereby said shaft and associated stapling arm, staple former and driver reciprocating means, and stapling arm oscillating means, may be swung away from said conveyor upon detachment of said coupling means from said drive shaft.

45. Apparatus for applying staples to continuously advancing workpieces including, a conveyor framework, a workpiece conveyor supported on said framework, a conveyor drive member for advancing said conveyor, stapling mechanism associated with said conveyor including a drive shaft, coupling means for detachably connecting said drive shaft to the drive member of said conveyor, a stapling arm including a casing swingably mounted on and wholly supported by said shaft and extending laterally therefrom over the workpiece supporting conveyor, a staple former and a staple driver slidably supported by said casing, a staple shaping anvil element slidably mounted in said casing, cooperating wire shearing elements associated with said casing and said staple former, and a staple clinching block mounted on the end of said casing, means operably connecting said staple former and staple driver to said drive shaft whereby said staple former and staple driver are reciprocated during rotation of said shaft, means operably connected to said drive shaft for oscillating said stapling arm in synchronism with the reciprocating movement of said staple former and staple driver, a bearing assembly rotatably supporting said drive shaft, a bracket fixed to said conveyor framework, and means pivotally connecting said bearing assembly to said bracket whereby said shaft and associated stapling arm, staple former and driver reciprocating means, and stapling arm oscillating means, may be swung away from said conveyor upon detachment of said coupling means from said drive shaft.

46. Stapling apparatus including a rotatably mounted drive shaft, a stapling arm mounted on and supported by said shaft and projecting laterally therefrom, said stapling arm including a casting presenting a pair of spaced guide walls, a thin connecting plate having an unobstructed outer face and an end block spaced from the inside face of said connecting plate, a staple former slidably supported by said casing, and presenting a pair of spaced leg extensions with staple forming grooves extending longitudinally along the spaced inner surfaces thereof and directly adjacent the inside face of said thin connecting plate, a staple driver supported by said casing and having a driving bar slidable between said leg extensions, a staple shaping anvil element slidably supported by said casing and having a staple forming end portion designed to project between said leg extensions, a staple clinching block mounted on the end of said casing and presenting a staple clinching face spaced from the end face of said end block to thereby define a workpiece receiving slot therebetween, and means operably connecting said staple former and staple driver to said drive shaft whereby said staple former and staple driver are reciprocated when said shaft is rotated.

47. Stapling apparatus including a rotatably mounted drive shaft, a stapling arm mounted on and supported by said shaft and projecting laterally therefrom, said stapling arm including a casting presenting a pair of spaced guide walls, a thin connecting plate having an unobstructed outer face, and an end block spaced from the inside face of said connecting plate, a staple former slidably supported by said casing and presenting a pair of spaced leg extensions with stapling forming grooves extending longitudinally along the spaced inner surfaces thereof and directly adjacent the inside face of said thin connecting plate, a staple driver supported by said casing and having a driving bar slidable between said leg extensions, a staple shaping anvil element slidably supported by said casing and having a staple forming end portion designed to project between said leg extensions, resilient means for projecting the staple forming end portion of said anvil element between the leg extensions of said staple former, a staple clinching block mounted on the end of said casing and presenting a staple clinching face spaced from the end face of said end block to thereby define a workpiece receiving slot therebetween, and means operably connecting said staple former and staple driver to said drive shaft whereby said staple former and staple driver are reciprocated when said shaft is rotated.

48. Stapling apparatus including a rotatably mounted drive shaft, a stapling arm mounted on and supported by said shaft and projecting laterally therefrom, said stapling arm including a casing presenting a pair of spaced guide walls, a thin connecting plate having an unobstructed outer face, and an end block spaced from the inside face of said connecting plate, a staple former slidably supported by said casing and presenting a pair of spaced leg extensions with stapling forming grooves extending longitudinally along the spaced inner surfaces thereof and directly adjacent the inside face of said thin connecting plate, a staple driver supported by said casing and having a driving bar slidable between said leg extensions, a staple shaping anvil element slidably supported by said casing and having a staple forming end portion designed to project between said leg extensions, resilient means for projecting the staple forming end portion of said anvil element between the leg extensions of said staple former, cooperating wire shearing elements supported by said casing structure and staple former, a staple clinching block mounted on the end of said casing and presenting a staple clinching face spaced from the end face of said end block to thereby define a workpiece receiving slot therebetween, and means operably connecting said staple former and staple driver to said drive shaft whereby said staple former and staple driver are reciprocated when said shaft is rotated.

References Cited in the file of this patent

UNITED STATES PATENTS

| Number | Name | Date |
|---|---|---|
| 1,491,272 | Perkins | Apr. 22, 1924 |
| 1,688,556 | Riesz | Oct. 23, 1928 |
| 1,692,015 | Leschhorn | Nov. 20, 1928 |
| 1,718,199 | Baumann | June 18, 1929 |
| 1,896,826 | Nasmith | Feb. 7, 1933 |
| 1,911,710 | Newhouse | May 30, 1933 |
| 1,928,134 | Newhouse | Sept. 26, 1933 |
| 1,993,483 | Leland | Mar. 5, 1935 |
| 2,063,345 | Scott | Dec. 8, 1936 |
| 2,194,628 | Wright | Mar. 26, 1940 |
| 2,370,745 | Monroe | Mar. 6, 1945 |
| 2,420,684 | Robinson | May 20, 1947 |